US007236950B2

(12) United States Patent
Savage et al.

(10) Patent No.: US 7,236,950 B2
(45) Date of Patent: Jun. 26, 2007

(54) METHOD AND SYSTEM OF COMBINED BILLING OF MULTIPLE ACCOUNTS ON A SINGLE STATEMENT

(75) Inventors: Patrick Savage, Jacksonville, FL (US); Jitendra Chhikara, Jacksonville, FL (US); Frederick W. Platz, Jr., Cleveland, TN (US)

(73) Assignee: Universal Card Services Corp., Jacksonville, FL (US)

( * ) Notice: Subject to any disclaimer, the term of this patent is extended or adjusted under 35 U.S.C. 154(b) by 818 days.

(21) Appl. No.: 09/181,658

(22) Filed: Oct. 29, 1998

(65) Prior Publication Data

US 2002/0026394 A1   Feb. 28, 2002

(51) Int. Cl.
*G06Q 40/00* (2006.01)
(52) U.S. Cl. .......................... 705/34; 705/39; 705/40; 705/31; 705/33
(58) Field of Classification Search ............. 705/34, 705/39–40, 31, 33, 19
See application file for complete search history.

(56) References Cited

U.S. PATENT DOCUMENTS

| | | | |
|---|---|---|---|
| 3,852,571 A | 12/1974 | Hall et al. ............. | 235/61.7 B |
| 4,485,300 A | 11/1984 | Peirce .................. | 235/380 |
| 4,701,601 A | 10/1987 | Francini et al. ........ | 235/449 |
| 4,734,564 A | 3/1988 | Boston et al. .......... | 235/380 |
| 4,839,504 A | 6/1989 | Nakano ................ | 235/379 |
| 4,893,248 A | 1/1990 | Pitts et al. ............ | 364/464.01 |
| 4,949,272 A | 8/1990 | Vanourek et al. ...... | 364/464.02 |
| 4,974,878 A | 12/1990 | Josephson ............. | 283/67 |
| 4,989,141 A | 1/1991 | Lyons et al. .......... | 364/408 |
| 5,008,929 A | 4/1991 | Olsen et al. .......... | 379/112 |
| 5,206,488 A | 4/1993 | Teicher ................ | 235/380 |
| 5,220,501 A | 6/1993 | Lawlor et al. ......... | 364/408 |
| 5,223,699 A | 6/1993 | Flynn et al. .......... | 235/380 |
| 5,264,665 A | 11/1993 | Delfer, III ............ | 177/25.15 |
| 5,283,829 A | 2/1994 | Anderson ............. | 380/24 |
| 5,287,270 A | 2/1994 | Hardy et al. .......... | 364/408 |
| 5,325,290 A | 6/1994 | Cauffman et al. ...... | 364/401 |
| 5,326,959 A | 7/1994 | Perazza ............... | 235/379 |

(Continued)

OTHER PUBLICATIONS

"ECTC Enters Wholesale Bill Presentment Arena", Retail Delivery News. Potomac: Oct. 28, 1998. vol. 3, Iss. 21; p. 1.*

(Continued)

*Primary Examiner*—Richard E. Chilcot, Jr.
*Assistant Examiner*—Timothy M. Harbeck
(74) *Attorney, Agent, or Firm*—George T. Marcou; Kilpatrick Stockton LLP

(57) ABSTRACT

A computerized method and system for combined billing for at least one customer on a plurality of customer accounts includes computer applications which automatically assemble and aggregate account charges, such as usage charges, fees, finance charges, discounts, rebates and rewards, for the customer on the plurality of accounts. The system also automatically formats a combined bill for the customer from the aggregated account charges and renders the combined bill to the customer. The account charges are automatically calculated by a computer application from account data for the customer's accounts, which is transmitted to the computer application from one or more storage devices, for example from vendors of energy, such as electricity and gas service, retail, such as credit cards, and communications, such as telephone and Internet service.

53 Claims, 31 Drawing Sheets

U.S. PATENT DOCUMENTS

| | | | | |
|---|---|---|---|---|
| 5,383,113 | A | | 1/1995 | Kight et al. ................. 364/401 |
| 5,465,206 | A | | 11/1995 | Hilt et al. .................... 364/406 |
| 5,477,038 | A | | 12/1995 | Levine et al. ................ 235/380 |
| 5,477,040 | A | | 12/1995 | Lalonde ....................... 235/380 |
| 5,483,445 | A | | 1/1996 | Pickering .................... 364/406 |
| 5,616,902 | A | | 4/1997 | Cooley et al. ............... 235/380 |
| 5,655,089 | A | | 8/1997 | Bucci .......................... 395/240 |
| 5,684,965 | A | * | 11/1997 | Pickering .................... 395/294 |
| 5,699,528 | A | | 12/1997 | Hogan ......................... 395/240 |
| 5,727,065 | A | * | 3/1998 | Dillon ........................... 380/49 |
| 5,737,710 | A | * | 4/1998 | Anthonyson .................... 701/1 |
| 5,754,655 | A | | 5/1998 | Hughes et al. ................. 380/24 |
| 5,832,460 | A | | 11/1998 | Bednar et al. ................. 705/27 |
| 5,835,580 | A | * | 11/1998 | Fraser ................... 379/115.01 |
| 5,844,973 | A | | 12/1998 | Venkatraman et al. ...... 379/127 |
| 5,850,520 | A | * | 12/1998 | Griebenow et al. .... 396/200.36 |
| 5,920,847 | A | * | 7/1999 | Kolling et al. ................. 705/40 |
| 5,943,656 | A | * | 8/1999 | Crooks et al. ................. 705/30 |
| 5,950,174 | A | * | 9/1999 | Brendzel ....................... 705/34 |
| 5,978,780 | A | * | 11/1999 | Watson ......................... 705/40 |
| 5,991,412 | A | * | 11/1999 | Wissenburgh et al. ........ 380/24 |
| 6,016,484 | A | * | 1/2000 | Williams et al. .............. 705/39 |
| 6,023,502 | A | * | 2/2000 | Bouanaka et al. ........... 379/115 |
| 6,032,132 | A | * | 2/2000 | Nelson ......................... 705/43 |
| 6,035,285 | A | * | 3/2000 | Schlect et al. ................. 705/30 |
| 6,044,362 | A | * | 3/2000 | Neely ........................... 705/34 |
| 6,047,267 | A | * | 4/2000 | Owens et al. .................. 705/34 |
| 6,047,274 | A | * | 4/2000 | Johnson et al. ............. 705/412 |
| 6,049,786 | A | * | 4/2000 | Smorodinsky ................ 705/40 |
| 2004/0133487 | A1 | * | 7/2004 | Hanagan et al. .............. 705/34 |

OTHER PUBLICATIONS

Danialle Weaver, On-line billing pushes the envelope(s) into cyberspace Electrical World, New York: Jul. 1998. vol. 212, Iss 7; p. 22.*

"Novazen Announces Availability of Consolidated Billing and Electronic Bill Presentment Software Products", Business Wire. New york: Aug. 10, 1998. p. 1.*

Frank Ceme, "Checkfree, Visa Launch Payment Service", Bank Technology News. New York: Jul. 1998. vol. 11, Iss 7; p. 1 (3 pages).*

Stevin Martin, "Checkfree-Integrion Team to Absorb Visa's Epay", Bank Technology News. New York: Aug. 1998, vol. 35, Iss. 8; p. 22 (page 1).*

David R. Lamm, "Banks Must Strive to be Electronic Billing Owners, Not Merely Agents", Bank Systems & Technology. New York: Aug. 1998. vol. 35, Iss 8; p. 48 (1 page).*

Burkhart, Lori A., Cross, Philip S., and Lewis, Beth; News Digest -Federal agencies -Business Wire; Public Utilities Fortnightly; pp. 14-19, Feb. 1, 1998.*

Defining the convergent billing marketplace, Saville, Spring 1997.*

AT&T signs agreements with EnergyOne, first national energy firm, AT&T News release, 3 pages, Jun. 24, 1997.*

Hart, John and Hermanson, Phil; EnergyOne adds to World-Class partner base with Saville CBP, 4 pages, Nov. 3, 1997.*

Morbin, Tony; One for all, and all for one, 7 pages, Jul. 6, 1998.*

Hart, John; AT&T Alestra uses Saville's Convergent Billing System to support One million customers in deregulated Mexican Telecom market.; Beaupre & Co. Public Relations, Inc. ed., 3 pages, May 22, 1998.*

Hart, John; Saville releases new version of CBP for IBM DB2/400 . . . ; Beaupre &Co. Public Relations Inc. Ed., 3 pages, Dec. 28, 1998.*

Hart, John; Saville selected for Convergent Billing System by Teligent; Beaupre &Co. Public Relations Inc. Ed., 3 pages, Oct. 9, 1998.*

Communicationsweek; Joint Bills from Sprint; n325; 27, Spring 1997.*

Article, dated Jul./Aug, 1979, entitled "Managing Utility Billing."

Article from The American Banker, dated Nov. 6, 1985, entitled "Bill Payment From InstaBank."

Article from The American Banker, dated Aug. 6, 1985, entitled "Electronic Banking Net Hits High in Transactions."

Article from the Arkansas Democrat-Gazette, dated Aug. 31, 1986, Byline: "CITY About 200,000 brochures promoting "checkless" utility bill payment . . . "

Article from The American Banker, dated Oct. 6, 1986, entitled "Electronic Bill-Paying Set by GM."

Article from Business Week, dated Nov. 2, 1987, entitled "Treasuries Go High-Tech."

Article from the Springfield Business Journal, dated Jul. 25, 1988, entitled "Moving One Step Closer to a 'Paperless Society.'"

Article from The Courier-Journal, dated Oct. 26, 1988, entitled "City, County Property-Tax Bill To Be Sent."

"Time and Billing Software: Seven Packages . . . ," Wolff, B., Nov. 22, 1988.

Article from The American Banker, dated May 9, 1989, entitled "Citicorp Offers Electronic Way For Consumers to Pay Utilities."

Article from the PR Newswire, dated Jun. 5, 1989, entitled "Western Union to Acquire National Payments Network, Add Electronic Bill-Paying to Consumer Services."

Article from The American Banker, dated Aug. 15, 1989, entitled "ZipCheck Service Predates ZapCheck, PNC Bank Says."

Article from The Long Distance Letter, dated Dec. 1989, entitled Yes, Virginia, There Will be a Postal Service in the 21st Century.

Article from the Chicago Tribune, dated Dec. 25, 1989, entitled "Family Losing Home Over Billing Mixup."

Article from the Communications News, dated Jan. 1990, entitled "Gateway Service Creates Grassroots Marketplace; Nynex Corp. Provides Info-Look Gateway Service."

Article from the Data Channels, dated Jan. 24, 1990, entitled "Even Technology Won'T Stop the Postal Service in 21st Century."

Article from the Advertising Age, dated Jul. 2, 1990, entitled "Card Issuers Poised to Fight AT&T."

Article from the Southwest Newswire, dated Jul. 31, 1990, entitled "MCI Business Customers to Get One Monthly Bill Instead of Two."

Article from the Network World, dated Sep. 24, 1990, entitled "Users, Telcos Ready EDI Spec for Phone Bills."

Article from the Consumer Reports, dated Oct. 1990, entitled "Paying Too Much Escrow?"

Article from the Advertising Age, dated Jan. 29, 1991, entitled "Directory of 'Who's Who' in Environmental Marketing."

Article from the Network World, dated Feb. 18, 1991, Body: "Southern New England Telephone Co. (SNET) recently announced software . . . ."

Article from the Cellular Business, dated Nov. 1991, entitled "Catching Up With Billing Needs; Real-Time Telephone Account Billing Services."

McGee, W.L. and Garrick, L.E., *Changes, Challenges & Opportunities in THE NEW ELECTRONIC MEDIA*, 1982; Ch. 4, Sec. 3.2.2, pp. 5-7.

* cited by examiner

OTHER FINANCIAL INSTITUTION SYSTEMS AND DATABASES

| # | System |
|---|---|
| 166 | FULFILLMENT SYSTEM |
| 168 | PROSPECT FILE |
| 170 | CREDIT CHECK SYSTEM |
| 172 | WORK MANAGEMENT SYSTEM |
| 174 | DISCONNECT FILE |
| 176 | VENDOR METHODS AND PROCEDURES |
| 178 | TAX MODULE |
| 180 | FORMAT DATABASE |
| 182 | ACCOUNTS RECEIVABLE SYSTEM |

FIG. 4

ADDITIONAL SYSTEMS AND DATABASES

- 184 — CUSTOMER RECORD DATABASE
- 186 — VENDOR ORDER PROCESSING SYSTEM
- 188 — PRODUCT/SERVICE PROVISIONING SYSTEM
- 190 — VENDOR ORDER ENTRY SYSTEM
- 192 — TECH/DATABASE
- 194 — WIRES AND PIPES DATABASE
- 196 — ENERGY USAGE DATABASE
- 198 — RETAIL COMPANY DATABASE
- 199 — VENDOR DATABASE
- 201 — RETAIL COMPANY DATABASE

| Payments and Adjustments | | | |
|---|---|---|---|
| Trans | Description | | Amount |
| 06/10 | PAYMENT RECEIVED | THANK YOU | -XX.00 |
| Total Payments and Adjustments | | | -$XX.00 |
| Billing Disputes | | | |
| Date | Description | | Amount |
| 05/20 | NOGALITOS GEAR COMPANY SAN ANTONIO TX | XX.00 | |

Services Summary

| | | | |
|---|---|---|---|
| Electric | | | $XX.00 |
| Security | | | $XX.00 |
| Warranties | | | $XX.00 |
| Total Services | | | $XX.00 |

Electric
1200KWH@.021 ............................................... XX.00
Federal Tax @ 3%  through 06/01/97  XX.00
$XX.00

Security Systems
Monthly Residential Service   XX.00
Monthly Commercial Service   XX.00
Federal Tax @ 3%  through 06/01/97
$XX.00

Warranties
Monthly Security System   XX.00
Monthly Heat Pump/HVAC   XX.00
Monthly Appliance   XX.00
Federal Tax @ 3%  through 06/01/97
$XX.00

Usage Comparison 1,200 kwh
1,000 kwh
0

| | MAY 1996 | JUN 1997 | JUL 1997 | AUG 1997 | SEP 1997 | OCT 1997 | NOV 1997 | DEC 1997 | JAN 1997 | FEB 1997 | MAR 1997 | APR 1997 | MAY 1997 |
|---|---|---|---|---|---|---|---|---|---|---|---|---|---|
| Month | Year | | | | KWH | | | Days | | | KWH/DAY | | |
| MAY | 1997 | | | | 847 | | | 31 | | | 26.5 | | |
| MAY | 1996 | | | | 756 | | | 30 | | | 25.2 | | |

| Telephone Summary | | | | | | | |
|---|---|---|---|---|---|---|---|
| Long Distance | | | | | | | $XX.00 |
| Total Services | | | | | | | $XX.00 |

Long Distance

Apr 2 - May 1, 1996
Charges for 510 670-6712:

| | | | | | | | |
|---|---|---|---|---|---|---|---|
| Calls | | | | | | | $XX.00 |
| Taxes and surcharges | | | | | | | XX.00 |
| Total Long Distance | | | | | | | $XX.00 |

This month you saved $9.64 with Long Distance.

Calls Eligible for Discount
Direct Dialed Calls

| No. | Date | Number Called | Where | Time | Rate | Type | Min | Amount |
|---|---|---|---|---|---|---|---|---|
| 1 | 06/10 | 310 450-3855 | Santa Moni, CA | 5:39am | night | direct | 3 | $XX.00 |
| | | | | | | | 3 | $XX.00 |

Calling Card Calls
Card Number: 327 885 4177

| No. | Date | Number Called | Where | Time | Rate | Type | Min | Amount |
|---|---|---|---|---|---|---|---|---|
| 5 | 05/02 | 310 450-3855 | Santa Moni,CA | 7:41pm | eve | station | 1 | $XX.00 |
| | | Called from 212 854 3276 | Los Angele,CA | | | | | |
| | | | | | | | 1 | $XX.00 |

Total calls eligible for discount $XX.00

Taxes and Surcharges

| Description | Amount |
|---|---|
| Federal tax | $XX.00 |
| State and local tax | XX.00 |
| Subscriber line charge (Jun 2 - Jul 1) | XX.00 |
| | $XX.00 |

FIG. 25

Credit Card Activity

| | |
|---|---|
| Amount Over Limit | $XX.00 |
| Credit Line | $7,000.00 |
| Available Credit | $2,750.00 |
| Cash Advance Limit | $1,000.00 |
| Purchases | $634.50 |
| Cash Advances and Checks | 25.00 |
| Total Credit Card Activity | $659.50 |

Purchases

| Trans | Post | Description | Amount |
|---|---|---|---|
| 05/26 | 05/28 | FINE HOTELS PARIS TX | $70.26 |
| 05/27 | 05/29 | ACME PRINTING OF CONCORD, MA | 8.34 |
| | | Total Credit Card Purchases | $78.60 |

Cash Advances and Checks

Cash Advance Limit $1,500.00* *This represents a portion of your total credit line.

| Trans | Post | Description | Amount |
|---|---|---|---|
| 05/29 | 05/30 | CONVENIENCE CHECK #354 | $50.00 |
| 05/30 | 05/31 | CASH ADVANCE NATIONAL BANK NEW YORK NY | 25.00 |
| | | Total Cash Advances and Checks | $75.00 |

Finance Charge Information

| | Nominal APR | Daily Periodic Rate | × | Number of Days in Billing Cycle | × | Average Daily Balance | = | Periodic FINANCE CHARGE | + | Cash Advance Fee/FINANCE CHARGE |
|---|---|---|---|---|---|---|---|---|---|---|
| Purchases | zz9.89% | z.9888%* | × | z8 | × | $$$,$$8.88 | = | $$$,$$8.88 | + | $$$,$$8.88 |
| Cash Advances | zz8.89% | z.9.888% | × | z8 | × | $$$,$$8.88 | = | $$$,$$8.88 | + | $$$,$$8.88 |

Total *FINANCE CHARGE* $0.00

Effective *ANNUAL PERCENTAGE RATE* 0.00%

*Indicates variable rate*

| Quick Reference | |
|---|---|
| Minimum Payment Due | $235.43 |
| Due Date | August 1, 1998 |
| Amount Past Due | $00.00 |

| Account Summary | |
|---|---|
| Previous Balance | $1,200.00 |
| Payments and Adjustments | - XX.00 |
| Services | XX.00 |
| Credit Card Activity | XX.00 |
| New Balance | $XXX.00 |

Note: Detailed activity starts on page 5.

| Just For You | | |
|---|---|---|
| Credit Card Purchases and Telephone Services | XXX.00 | |
| Rebate percentage | x 1.0% | |
| Cash back you earned this period | $XX.00 | |
| Total cash back earned to date | | $XX.00 |

| Payment Summary | Minimum | Maximum | Your Payment |
|---|---|---|---|
| Electric (due in full) | XX.00 | XX.00 | |
| Credit Card (due in full) | XX.00 | XX.00 | |
| Payment Total | | | $ |

How to Reach Us
Electric Services
Account Online: www.ele.com
Customer Service: 1 800 629-8892

Choose your own due date
You have the flexibility to choose when your payment is due. To adjust the date call 1 800 629-8892. See page 2 for details.

Electric Partners with Credit Card
Electric, a leader in the world of electrotechnologies, partners with Credit Card Services to bring you wise energy-savings solutions. See page 2 for details.

Account has answers.
Get automated account information anytime, day or night. Call Account for a toll-free update:
1 800 633-2982. See page 2 for details.

---

Payment Record   Amount Paid: _____   Date Paid: _____   Check Number: _____

Please detach and return this coupon with payment.

| Account Number | Payment Due | New Balance | Minimum Payment | Enter Amount Enclosed |
|---|---|---|---|---|
| 1222 5467 3333 2543 | 8/1/98 | $XXX.00 | $XXX.00 | $ |

288 40 1011 29 01 B

Make changes to U.S. billing address and phone number below:

| Address | | Apt./Suite |
|---|---|---|
| City | State | Zip |
| Home phone ( ) | | Business phone ( ) |

Make check payable to:

Universal Account
PO BOX 23455
COLUMBIA, IN 41702-0023 xxxxxx x. xxxxxxxx
xxxxxxxx xxxxxxxx
xxxxxxxxxxxx, xxxxxxxxx-xxxx

5392550013726289000002200000001025752

Four key industries account for most of recurring payments volume, yet have low card penetration levels

| | Annual* Expenditures | At 100MM customers Expenditures | Card** Penetration | |
|---|---|---|---|---|
| • Insurance/Annuities | $306B | $255 | <1% | ⎫ |
| • Utilities | $141B ⎫ | $117 | <1% | ⎪ Opportunity |
| • Telephone/Cellular | $ 74B ⎬ 94% | $ 62 | <2% | ⎬ |
| • Cable TV/Pay TV | $ 21B ⎭ | $ 17 | <2% | ⎪ |
| • Subscriptions | $ 16B | $ 13 | 15% | ⎭ |
| • Membership Org. | $ 11B | $ 9 | 10% | |
| • Rentals | $ 6B | $ 5 | -- | |
| • On-line Services | $ 2B | $ 2 | 80% | |
| | $579B | | | |

*Source - The Nielson Report - 1996
**Source - MasterCard International

FIG. 30

METHOD AND SYSTEM OF COMBINED BILLING OF MULTIPLE ACCOUNTS ON A SINGLE STATEMENT

FIELD OF THE INVENTION

The present invention relates to the field of computerized billing and more particularly to a system and method for combined billing statements of customers of multiple vendors of goods and/or services on a single periodic statement.

BACKGROUND OF THE INVENTION

On the whole, the credit card industry is losing its return on equity. In 1990, credit card providers, as a whole, were making about three percent return on assets after tax. Just eight years later, the return on equity was little more than one percent. During the same period of time, the number of credit card providers in the marketplace shrank from about 6,000 to only about 3,000. Thus, there are fewer and fewer players with lower and lower return on assets, and the trend appears likely to continue in the future. Credit card providers make revenue and have expenses that are primarily associated with three types of costs: cost of funds, cost of losses (bad debts), and operating costs. During the current period, the revenue of credit card providers continues to decline. In 1990, a consumer could obtain a credit card as long as he or she was willing to pay an interest rate of, for example, 19.8 percent with a $20 annual fee. Eight years later, there were a wide variety of prices, and the return on assets from the revenue that credit card providers were receiving continued to decline. Concurrently, the marketing to offer new credit cards to consumers increased from 500 million in 1990 to over three billion pieces of mail in 1997. This expansion of available credit for consumers added to mounting bad debt problems in the industry and record numbers of consumer bankruptcy filings.

Therefore, in order to make money, it is necessary for credit card providers to devise a way to lower infrastructure cost. A credit card provider has little control over its cost of financing. Therefore, the credit card provider must look at operating cost and endeavor to think creatively on how it can reduce such costs in order to give itself a strategic cost advantage. One possible way to reduce cost is to reduce the level of customer service, which would likely create dissatisfied customers. A far more attractive way to reduce cost is to leverage services over a bigger infrastructure, for example, by combining billing with multiple providers of goods and/or services. An attractive market to target is industries that provide recurring services, and statements, to the consumer. These are industries such as telephony, insurance/annuities, cable/pay television, the energy markets (gas, water, and electricity), and home security. Service providers such as energy companies are shifting to a deregulated industry like that of the airline, financial and long distance telecommunications industries. Customers are able, or will be able, to choose from a wide variety of marketing entities which will provide their electricity. This choice encourages energy service companies to add value to their offering by lowering cost and developing new products and services and, in a sense, competing to be a full home services provider.

The electric and utility industries have annual revenues which exceed the yearly revenue of the long distance telecommunications industry and the local phone market, and these industries together have combined revenues that come close to rivaling the overall sum spent on all general purpose credit cards. Proposed deregulation includes, for example, the creation of non-profit corporations in charge of buying power from current monopoly power companies and for monitoring the transmission of power throughout a state, as well as the restructuring of utility companies to become local power distribution companies. In other words, under proposed deregulation, energy companies move away from vertical integration and divide the functions of generation (i.e., managing power plants to produce electricity); transmission (i.e., moving electricity from the power plant to the factory, office, or home); distribution (i.e., retailers marketing to the public); and marketing (i.e., selling electricity and the services associated with it to end users and maintaining the customer relationship). Similar to other deregulated industries, increased market competition and the ability for customers to select from multiple energy providers poses a great risk for energy companies, for example, in loss of share and increased losses. Deregulation opens opportunities for credit card providers, as well as for energy providers. Credit card providers increased overall card usage from 11% of all transactions in 1980 to 17% in 1998. Utility payments provide another way of increasing that percentage.

In fact, it is estimated that the market size of the recurring bill market rivals the one trillion dollars spent annually on all credit cards in the U.S. There is a current need to provide a computerized system for combined billing of multiple vendor statements for a customer—for example, telephony, energy, cable, water, home security, and gas—on a single statement, in order to take advantage of the recognized competencies of credit card providers for marketing, receivable management, risk management and statementing, to reduce those risks to the recurring bill providers.

SUMMARY OF THE INVENTION

It is a feature and advantage of the present invention to provide a computerized system for combined billing of multiple vendor accounts for a customer which affords the ease and convenience of a single statement with multiple payment options, which may include a customer incentive reward system, and which enables knowledgeable consumer analysis.

It is a further feature and advantage of the present invention to provide a method and system of combined billing which allows improved customer database management and access systems, analysis and insights for marketing results reporting, and targeting of customer selection to maximize revenues and minimize risk.

It is an additional feature and advantage of the present invention to provide a method and system of combined billing which enables automated list management and tracking, selective bill inserts and statement messaging, capabilities for direct mail and telemarketing management, and access to existing credit card customers to market additional services.

It is another feature and advantage of the present invention to provide an automated method and system of combined billing which improves strategic allocation of resources by concentrating on consumer focused marketing and improved product/services offerings (i.e., core competencies) and decreasing resources required for receivables management (financing, risk management, and collections) and billing functions.

It is another feature and advantage of the present invention to provide a method and system of combined billing that increases the value to the end consumer by affording the convenience and simplicity of one simple statement, highest quality customer care, and potential customer incentive programs.

It is a further feature and advantage of the present invention to provide a computerized method and system of combined billing that improves marketing results by furnishing a complete end-to-end billing solution, that affords the benefit of access to the customers, systems and knowledge of a credit card provider, for example, a financial institution such as a bank, that supports expanded product lines by offering combined billing, and improves retention of current customers and attraction of new consumers.

It is another feature and advantage of the present invention to provide a computerized method and system of combined billing that is supported by the financial institution's abilities and strategies which offers an addition to multi-card credit, cash and calling capabilities in the form of a "product" to create advantages for retailers, such as economies of scale to lower costs inherent in the system with multiple bills, increased revenue in the form of fees as a part of delivering the service to the financial institution's partners, and new consumer value propositions.

It is another feature and advantage of the present invention to provide a computerized method and system of combined billing which enables the billing of multiple product lines on a single statement, sharing the financial institution savings with the financial institution's clients and consumers, upselling customers of the financial institution's clients to become credit card customers, maximizing data mining opportunities across the system, and maximizing financing opportunities by purchasing receivables at a discount.

All types of utilities, such as telephone, energy, water, gas, cable, and home security, deliver their products and services to customers efficiently and expertly, but are not particularly efficient or expert in doing things, such as billing, receivable management, collections, data warehousing, and marketing or database marketing. The method and system of computerized combined billing, according to the present invention, provides a tremendous convenience to the consumer, for example, the ability to receive multiple statements in a single envelope with multiple payment options or reward propositions. At the same time, it provides valuable cost advantages, for example, to these utilities. Instead of multiple collection calls to a consumer, for example, to collect for these energy, telephone, and credit card bills, only a single call is required. Further, processing cost (i.e., the cost for processing the payment), statement delivery costs, collections cost, credit warehousing and data cost, and management and system infrastructure cost are leveraged across a wide array of services. Moreover, in addition to the incremental cost advantage, the financial institution also has exclusive distribution rights for delivering its products and services to the marketplace. Additionally, there is the potential for the recurring bill provider to finance its 30-day outstandings at an improved cost. Many recurring bill providers ratings (e.g., Standards & Poors; Moodys) are based on higher risk bond ratings—therefore higher costs associated with the company risk. Purchasing the receivable "one customer at a time" allows the bank the ability to use its open market systems to achieve a much improved cost that is mostly returned to the utility partner. Since the utility company risk of non-payment is eliminated and only the consumer risk is left, the chance of 100% default risk (company closes) is eliminated, resulting in better financing rates provided by the bank's position.

In an embodiment of the present invention, a financial institution, such as bank, which issues credit cards, contracts with various companies to have all of their bill data delivered to the financial institution electronically. The financial institution stores the data at a customer level in its computer system. At the appropriate cycle time for a particular customer's account (i.e., the time at which the financial institution delivers a statement once a month to the customer), the financial institution's computer system automatically generates a combined statement and delivers it to the customer. When the financial institution receives the data electronically, for example, from the telephone company, it is stored in the financial institution's computer database. A single transaction is written out to by the financial institution's account receivable computer system, sometimes referred to herein as "total systems." At different times in the month, the financial institution receives data electronically, for example, two or three different phone bills for a customer, which are reading out transactions one at a time to the financial institution's accounts receivable system. The financial institution can also be receiving, for the same customer, the customer's cable company, gas, water, and electric bill data, each reading out a transaction into the financial institution's account receivable system. When the account receivable system actually cycles, having accumulated the entire balance, any finance charge, late payment charge, or miscellaneous fees, computing the minimum payment amount and basically keeping the account in balance, the data image is forwarded to the financial institution from the financial institution's processing system, "total systems." The financial institution identifies each of those individual transactions that are read out and pulls them off of the statement and replaces them with the full image of the statement. Accordingly, the customer receives a complete branded statement for the customer's energy, water, gas, cable, and telephony, and a summary page with multiple payment options from which the customer can pay the account.

In an embodiment of the present invention, the financial institution receives transactions throughout the period of the month, and if a customer misses a payment, it has already settled with each individual provider of goods/services, such as the gas, telephone, cable, or water company. The financial institution's system is provided with different authorization parameters, for example, with one payment missed, the financial institution continues to accept receipt of the individual invoices. The financial institution begins a single collection call for the customer against all of the balances that are left unpaid. Collection activity can be as simple as statement messages or as complex as dunning letters, eventually leading to telephone calls to the consumer. Eventually, the matter may be referred to a collection agency that actually undertakes legal action to collect the debt on behalf of the financial institution. The receivables are actually purchased by the financial institution from each of the individual entities furnishing goods or services in a contractual arrangement, and paid for by the financial institution within a short period of time after the financial institution receives the statement from the entity furnishing the goods or services. However, ownership of the receivable is passed to the financial institution from the day the invoice data is received. Therefore the debt is the liability of the financial institution, and it is up to the financial institution to use its expertise in order to maximize the collection performance and minimize the overall bad debt rate of all of the accounts together.

The combined billing method and system of the present invention gives the financial institution the ability to have exclusive distribution for these providers and services, in addition to the ability to leverage the financial institution's infrastructures to create cost advantages. One of the advantages of the system is that it allows each of the individual providers of goods and/or services to use the financial institution's marketing database system in combination with other individual providers. For example, subject to applicable laws and service policies, a telephone company and a home security company can agree mutually to target specific customers based on the databases housed within the financial institution's computerized central information repository. While the financial institution guarantees the privacy and principle matters of the data, the telephone company and the home security company can contract together to run a joint marketing program, each individually writing criteria around their data and targeting this information to the consumer for different value propositions. Moreover, the home security provider may identify one or more of its customers recorded in the database who are not recorded in the database as customers of the telephone company, and the telephone company and the home security provider may cooperate in order to create a new customer for the telephone company by offering a joint value proposition using the marketing database.

The combined billing method and system of the present invention affords providers of goods and/or services the advantages of strategic cost savings and distribution opportunities. It also affords such providers the ability to leverage off the financial institution's expertise in receivable management, marketing, billing, and multi-premise billing (e.g., combining multiple telephone statements that might otherwise go out at different times during the month from different premises into a single customer account). It also gives such providers the ability to integrate their own multiple accounts for a single customer with a single point-of-contact customer care number, so that when the customer calls, the financial institution understands exactly which account is meant. If a customer has, for example, telephone, energy and gas, and calls the financial institution about the telephone account, the customer is automatically routed into the telephony service provider for handling. In other words, the system is integrated to enable a consumer to reach a single point-of-contact and each individual provider of goods and/or services to continue their own customer care and servicing, while allowing the financial institution to handle the complex part of billing and data management.

An embodiment of the present invention addresses the move to deregulation in the energy companies industry and offers an approach to the energy market that both expands and utilizes current core competencies of providers of credit cards, for example, financial institutions such as banks, by creating a unique value proposition to utility companies. The system and method of combined billing of the present invention leverages the competencies of a credit card provider to deliver key components of a customer account management system to utility companies. In order to provide a total solution to all the recurring monthly bills a consumer receives, the financial institution provides a value proposition of a combined billing statement, for example, for utility companies in local, consortium, or brand markets.

While many companies have begun looking for alternative ways to retain and incent customer loyalty, such as co-branded credit cards with rewards, the combined billing method and system of the present invention enables a financial institution to provide a vastly larger value proposition based on its core competencies as an entire package or parts as a single solution. The company can opt to have the financial institution furnish the total solution, or it can choose single aspects, such as statementing or co-billing, which goes far beyond simply co-branding. The value to the company is money saved and reinvested by partnering for billing, receivables, and collections, thereby allowing more funds to be available to incent and market to consumers. This makes it possible for these companies to invest heavily in the technology and marketing costs necessary to gain and protect share, freeing them from distractions and avoiding inefficiencies. The value for the financial institution is expanding its business through customer receivable management, reducing attrition, and increasing revenue through fees associated with the competencies of the financial institution.

In an embodiment of the present invention, the financial institution is able to increase its revenue through, for example, statementing savings of sharing or providing a service to the energy companies. The financial institution also increases revenue through financing with cost of funds and securitization at a lower cost than those of energy companies. Additionally, revenue is increased by customer servicing, namely, managing more efficiently than a utility via VRU technology. Further, the financial institution increases revenue by risk management in managing credit losses and fraud claims. The financial institution likewise increases revenue in collections by managing collections more efficiently than a utility because of technology. Financial institution revenues are also increased by exporting bank rates, such as interest charges and fees on receivables that these companies might not be able to charge. In addition, financial institution revenues are increased through fee services related to marketing (acquisitions and portfolio) and information data mining. In order to satisfy all types of consumers, the financial institution furnishes management on various levels. For example, the financial institution performs billing management for a utility company in combination with a calling card, long distance and calling card, or long distance and calling card plus credit card. Consumers are incented to "add-on" to a single utility bill (i.e. with cash back or rewards points), while enjoying the convenience of having only one bill to pay.

To achieve the stated and other features, advantages and objects of the present invention, an embodiment of the invention provides a method and system for combined billing for at least one customer on a plurality of customer accounts. An embodiment of the method and system of the present invention aggregates account charges for at least one customer on a plurality of customer accounts. A combined bill for the customer is automatically formatted from the aggregated account charges, and the combined bill is automatically rendered to the customer. The account charges are automatically calculated by a computer application, for example, an application program of a financial institution, such as a bank, from account data for one or more customer accounts. The account data is transmitted to the computer application from a data storage device, such as a vendor database. The customer accounts include at least one of the following: an energy account, a retail account, a communications account, or a financial account. Energy accounts include electric, gas, cable, home security, or water service accounts. Retail accounts include one or more credit card accounts. Communications accounts include long distance, local or wireless telephone service accounts or an Internet access account. Financial accounts include insurance, investment, auto, bank, installment or mortgage accounts. Other services may be included.

In an embodiment of the present invention, one or more account charges are automatically formatted and transmitted to a bill aggregator, which aggregates the account charges. The account data from which the account charges are calculated includes usage data, such as energy usage data. The usage data is used to calculate usage charges according to a predefined usage pricing schedule, and the usage charges are used to calculate an associated usage tax according to a predefined usage charge tax schedule. The account charge is automatically calculated from the usage charge and the associated usage tax. When account data is received by the financial institution computer application, it is automatically validated by comparing the data with predefined account data parameters, and data which falls outside the parameters is automatically rejected. Account charges are also automatically validated by comparing the account charges to predefined account charge parameters and rejecting charges which fall outside the predefined parameters. The account charges are aggregated by automatically assembling the charges and automatically calculating a discount for the assembled charges according to a predefined discount schedule. The aggregated account charges are calculated from the assembled account charges and the associated discount, and the aggregated account charges are likewise validated.

In an embodiment of the present invention, the formatted bill consists, for example, of an electronic mail message. The formatted bill is automatically stored in a storage location, such as a server and transmitted from the storage location to a terminal, such as the customer's personal computer, where it is displayed by the customer. The customer transmits messages to a customer representative of the financial institution or a customer representative of a vendor of one or more of the customer's accounts. Customer messages are transmitted, and appropriate actions and responses are implemented and transmitted, by and between, for example, the customer at a terminal, such as the customer's personal computer, and computer systems of the financial institution, vendors, and retail companies. Such messages for the customer include inquiries about customer accounts, requests for customer information changes, orders, order processing, cancellations, and bill adjustments. When the combined bill is rendered to the customer and received by the customer, the customer pays the bill.

In an embodiment of the present invention, the account charges are automatically aggregated, the combined bill is automatically formatted from the aggregated account charges, and the combined bill is rendered to the customer by applications running on one or more servers, such as financial institution or bank servers.

Additional objects, advantages and novel features of the invention will be set forth in part in the description which follows, and in part will become more apparent to those skilled in the art upon examination of the following or may be learned by practice of the invention.

BRIEF DESCRIPTION OF THE DRAWINGS

In the figures:

FIG. 4 is a table which illustrates other financial institution software applications and modules for an embodiment of the present invention;

FIG. 5 is a table which illustrates additional software applications and modules for an embodiment of the present invention;

FIGS. 24–29 show a sample of the combined statement generated for the customer by the statement generation system for an embodiment of the present invention; and FIG. 30 depicts the annual expenditures by industry.

DETAILED DESCRIPTION

Figure 1:
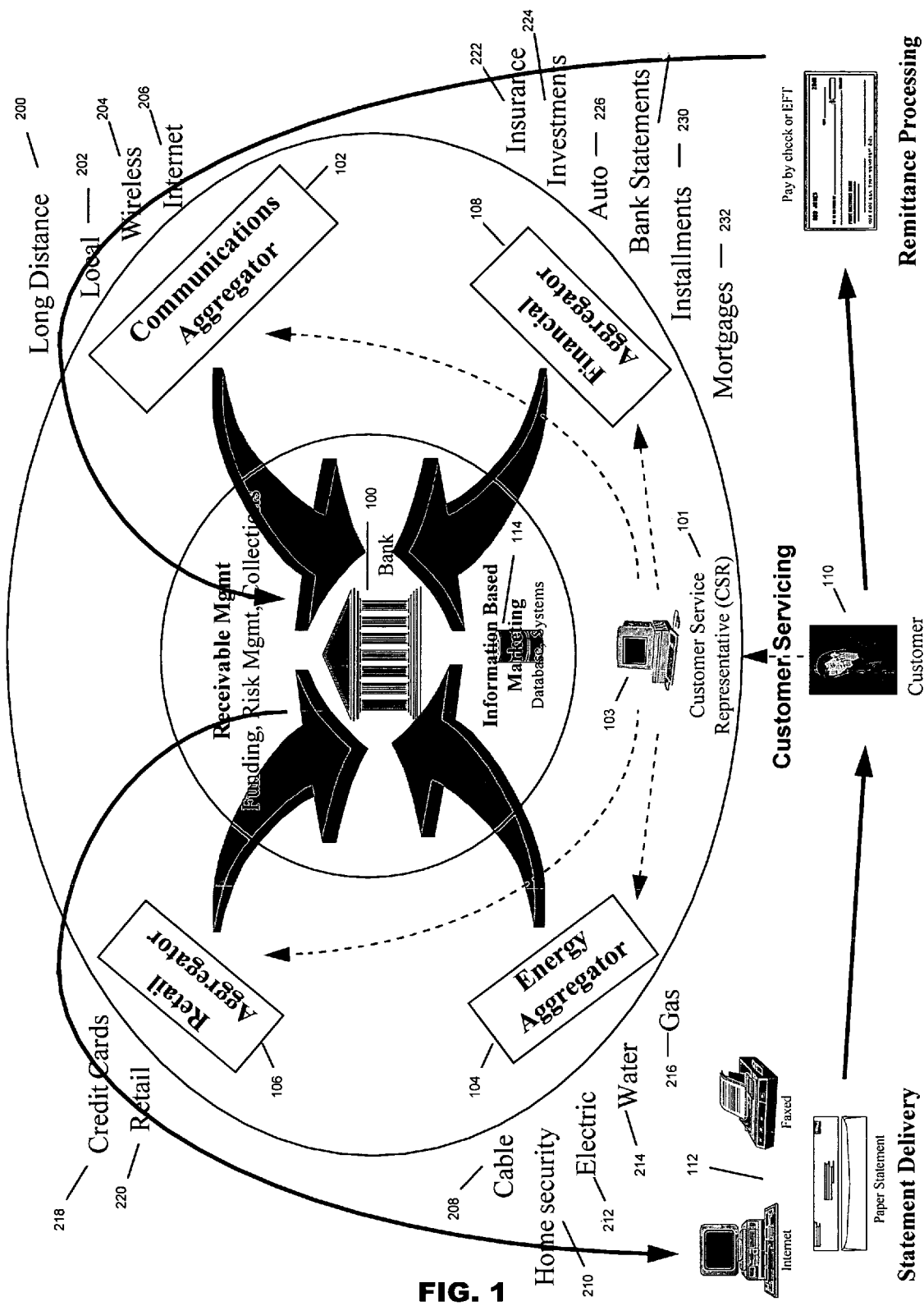
FIG. 1 shows an overview of the key components for an application of the combined billing system for an embodiment of the present invention and the flow of information between the components.
Figure 1A:
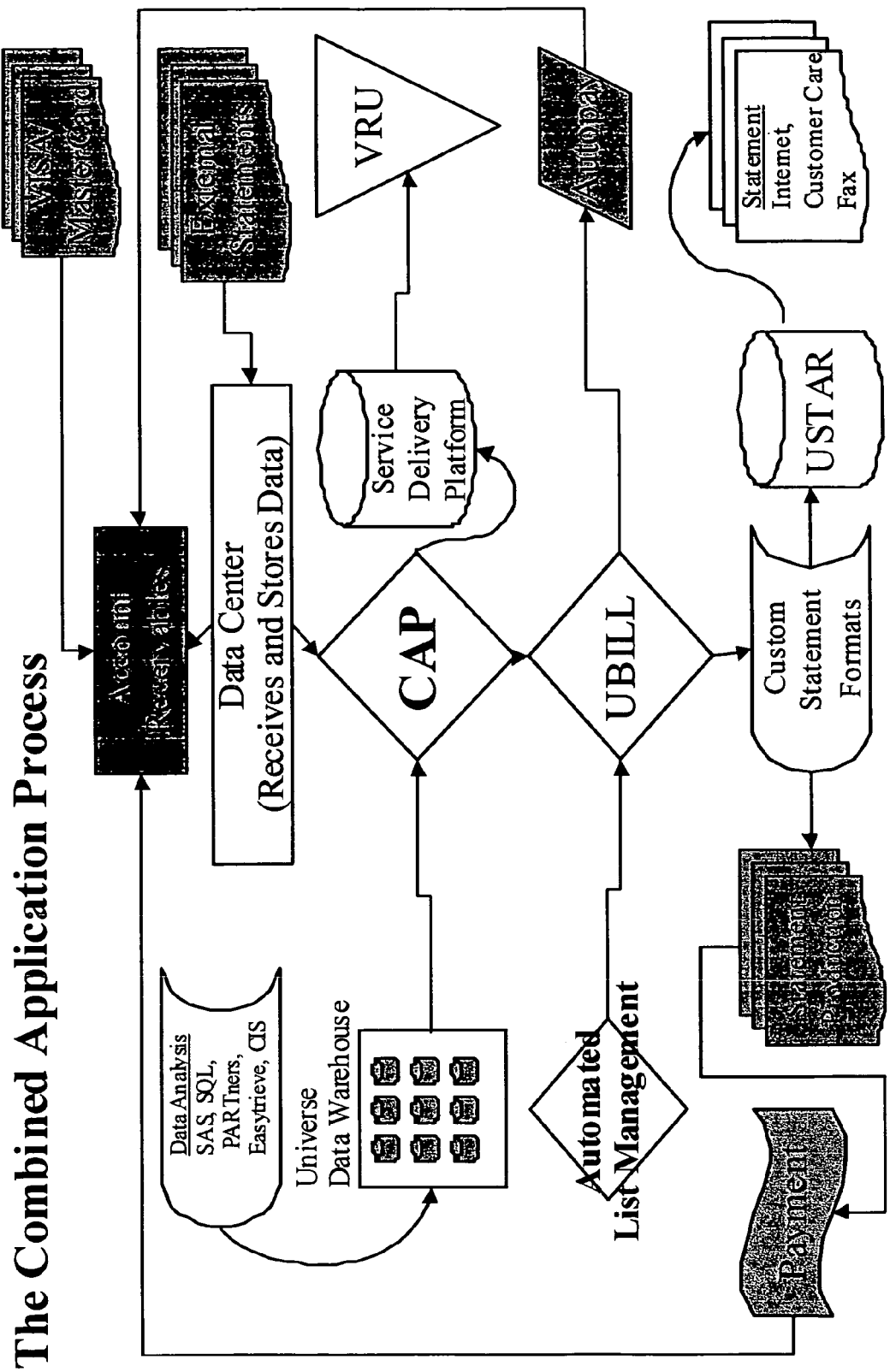
FIG. 1*a* presents a flow diagram of the combined application process.

Referring now in detail to an embodiment of the invention, an example of which is illustrated in the accompanying drawings, FIG. 1 shows on overview of the key components for an application of the combined billing system for an embodiment of the present invention and the flow of information between the components. Referring to FIG. 1, the financial institution 100, such as a bank, is the entity which provides back office support for products and services, such as communications 102 (e.g., long distance 200, local 202, wireless 204, and Internet 206); energy 104 (e.g., cable 208, home security 210, electric 212, water 214, and gas 216); retail 106 (credit cards 218 and retail 220); and financial 108 (e.g., insurance 222, investments 224, auto 226, bank statements 228, installments 230 and mortgages 232). The consumer or customer 110 is the person or entity, for example, at a terminal 112, such as a personal computer, who purchases the products and services that are offered and who is billed by the financial institution 100 and who remits payment to the financial institution 100. FIG. 1a presents a flow diagram of the combined application process.

Figure 2:
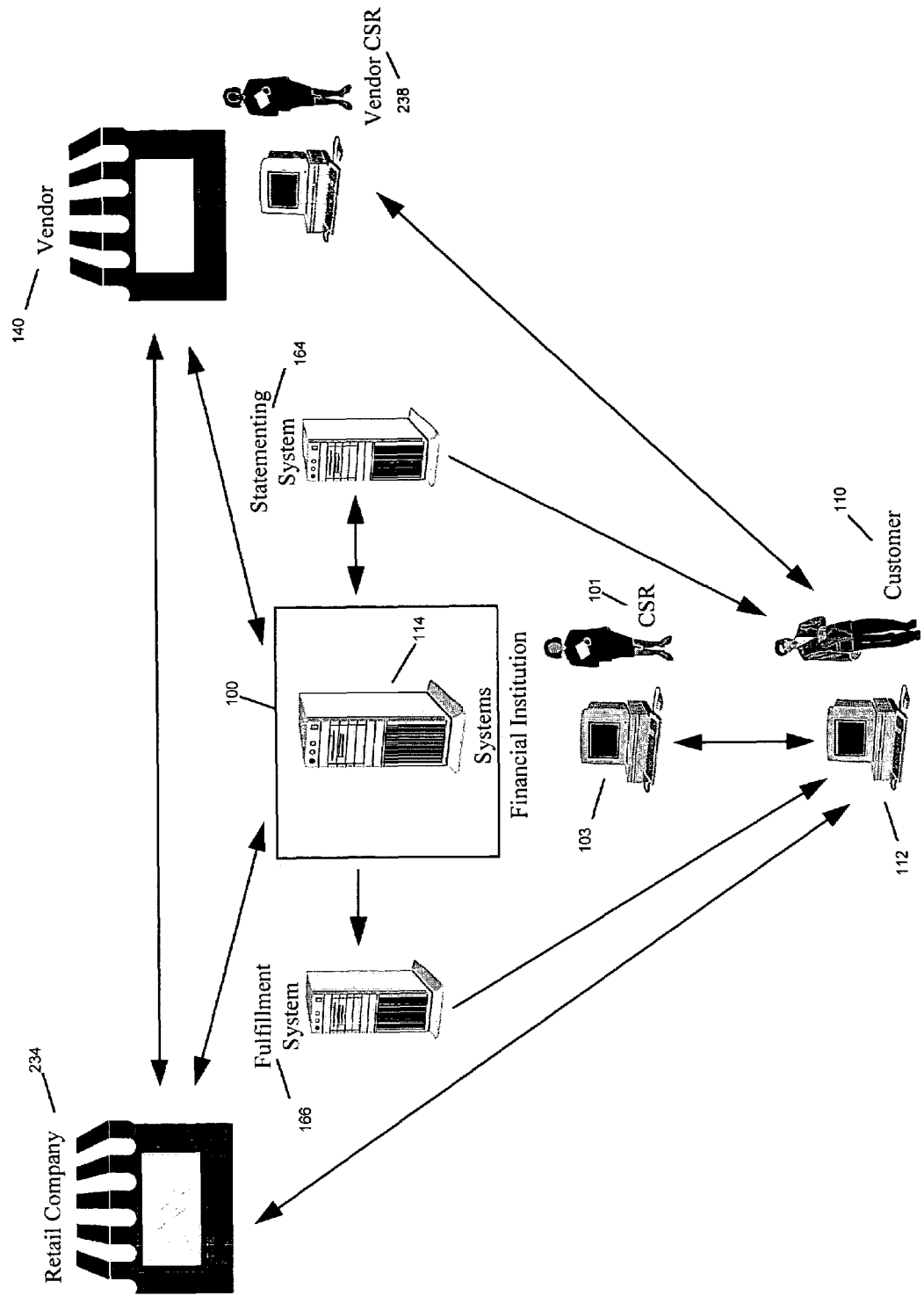
FIG. 2 is a simple schematic overview of the key components for an embodiment of the present invention, which provides further detail regarding the flow of information shown in FIG. 1.

FIG. 2 is a simple schematic overview of key components for an application of an embodiment of the present invention, which provides further detail regarding the flow of information shown in FIG. 1. Referring to FIG. 2, the "retail company" 234 is the entity which offers products and services to the retail market and is the client of the financial institution 100. In general, "supply chain vendors" 140 are the entities which provide the products and services that are offered for sale through retail company channels. Computer systems 114 of the financial institution 100 are configured to perform billing functions, such as bill calculation, bill aggregation and statementing, and payment processing. The financial institution's customer service representative (CSR) 101 is the person, for example, at a terminal 103, communicating with the customer 110 and the financial institution's computer systems 114. Bill calculation by computer systems 114 of financial institution 100 involves receiving and validating energy usage data feed, for example, from a vendor 140, such as energy retailer 104 shown in FIG. 1, automatically calculating charges and taxes based on the energy pricing parameters of the energy retailer 104, and generating usage, accounting, and settlement reports to the energy retailer 104. Bill aggregation and statementing by computer systems 114 involves automatically combining, for example, the energy 104, telecommunications 102 and credit card 106 statements, using the financial institution's credit card system interchange network to speed bundle offers to market, calculating bundled discounts, rebates and rewards, and automatically rendering a combined statement, such as paper, fax, web-based or disk to the customer 110. Payment processing by the financial institution's computer systems 114 is the processing of payment received from the customer 110, for example, by check, autopay, or the Internet.

In an embodiment of the present invention, the financial institution's computer systems 114 are also configured and coupled to one another to support receivables management, such as financing of receivables, receivable functions, risk management and collections. Financing of receivables, such as energy receivables, involves automatically discounting the purchase of receivables for immediate cash and to lower the cost of financing of receivables, including potential securitization. Receivable functions include rates, such as fees or interest, balance information, late fees and interest calculation by service, authorizations and status of account, and payment methods, for example, weekly, bi-weekly, monthly, and minimum due. Risk management covers credit policy and fraud management. Collections functions relate to early and late stage delinquency collections, charge-off and bankruptcy processing and posting charge-off recovery and agency management. Customer care functions are likewise implemented by computer systems 114 of the financial institution, including for example, customer servicing, customer information acquisition and maintenance, and bill inquiries. For example, customer servicing involves receiving and processing requests for energy service, responding to customer inquiries about energy service, and processing requests, for example, for energy service bill adjustments. Customer information acquisition and maintenance covers customer profile and prospect database, past statement images, and interface to a customer servicing platform. Bill inquiries functions relate, for example, to balance, payment amount and date.

In an embodiment of the present invention, the computer systems 114 of the financial institution 100 that are configured and coupled to one another to implement the various functions for an application of combined billing system of the invention include servers running, for example, on Sun, HP 9000 and/or IBM MVS; desktop computers supporting, for example, Sun Workstation (for financial institution environment) and Win95/NT (for call center environment); networks, such as a TCP/IP network; database systems, such as Oracle and/or DB2; desktop applications, such as Sun, with Motif or Openlook, application messaging, adherence to Sun Openlook GUI standards, real-time browser integration, "thin client" appliances, and CTI integration. Desktop applications for an embodiment of the present invention also include Windows, COM, adherence to Windows GUI standards, real-time browser integration, "thin client" appliances, and CTI integration. System interfaces for an embodiment of the present invention include messaging, such as CORBA interfaces, IIOP interfaces, IBM message queuing, flat file inputs and outputs, RPCs/APIs (published), and also includes Web-enabled access.

Figure 3:
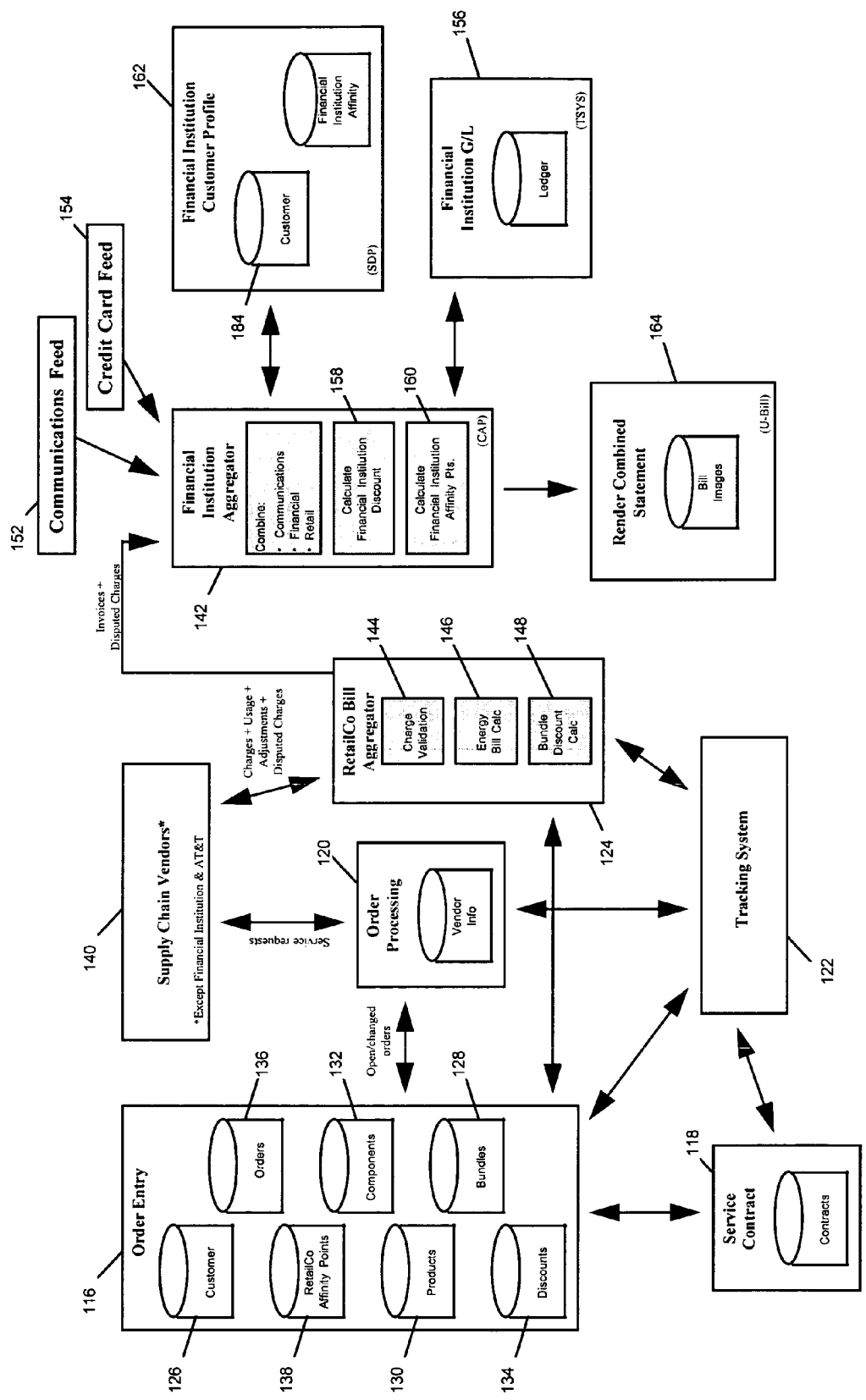
FIG. 3 is a schematic diagram which illustrates the primary software modules for an embodiment of the present invention and further amplifies the flow of information shown in FIGS. 1 and 2.

FIG. 3 is a schematic diagram which illustrates the primary software modules of computer systems 114 for an embodiment of the present invention and further amplifies the flow of information shown in FIGS. 1 and 2. The software modules of computer system 114 are coupled to one another and implemented, for example, to take orders, request service, and create invoices for the retail company. These modules include, for example, order entry 116, service contract 118, order processing 120, tracking system 122, and retail company bill aggregator 124. The order entry software modules 116 store and enable the customer service representatives (CSR) 101 to access data relative to all retail company customers 126, bundles 128, products 130, components 132, discounts 134, orders 136, and affinity points 138. The service contract software module(s) 118 track all appliance service contracts and service performed against these contracts. The order processing software module(s) 120 interface with the supply chain vendors 140 to request new service, modify existing service, or terminate service. The tracking system software module(s) 122 track all outstanding items that need to be resolved and notifies the CSR 101 of any exceptions that require attention. The retail company bill aggregator software module(s) 124 accepts charges from the supply chain vendors 140 and process these charges before forwarding the charges to the financial institution aggregator (CAP system) 142. The processing functions of the retail company bill aggregator software module(s) 124 include charge validation 144, bill calculation for energy 146, discount calculation 148, and affinity point calculation.

In an embodiment of the present invention, the financial institution's bill aggregator or CAP system 142 accepts multiple billing feeds, including retail company 124, telephony 152 and credit card 154 charge data or other recurring bill providers, and posts these charges to the customer's account in the financial institution's general ledger system (TSYS system) 156. At the end of the customer's billing cycle, the financial institution's bill aggregator system 142 processes all the charges posted against the customer's account, including credit card and retail company charges, and creates the customer's bill, placing the appropriate charges in the credit card and/or retail company's portion of the bill, and applies any discount 158 and/or affinity points 160 awarded by the financial institution 100. The financial institution customer profile system (SDP system) 162 contains all information about a customer and his or her order that is required for the financial institution's bill aggregator or CAP system 142 to process the bill. The retail company specific information includes customer demographics, the retail company relationship, and billing preferences.

In an embodiment of the present invention, the render customer statement system (U-bill system) 164 accepts the bill from the financial institution's CAP System 142 and renders the bill in the customer's preferred format (paper or electronic). The financial institution general ledger system or TSYS system 156 serves as the financial institution's general ledger, where all charges, adjustments, and payments are posted. Computer systems of the retail company 234 process all settlements with its supply chain vendor 140. The financial institution 100 provides necessary reports to the retail company 234 for this purpose. Certain events are monitored by the tracking system 122, and if necessary, are resolved by intervention of the CSR 101, for example, bill calculation, order processing, order entry, and bill inquiry. The CSR 101 may resolve bill calculation issues, such as line items where the component or price does not match, line items where the price does not match, or line items that are un-readable or out of bounds. The CSR 101 may also resolve order processing issues, such as non-acknowledged orders or rejected orders. Further, the CSR 101 may follow up order inquiries and handle requests for disputes.

An embodiment of the present invention includes, for example, the functions supported, system configuration, system architecture, management reports, and error resolution. The system also includes, for example, the processes of marketing, customer care, bill calculation, retail company bill aggregation, statement generation, receivables management, and settlements. The marketing services include portfolio communication, client services, and marketing datamining. Portfolio communication involves providing routine communication with all customers to distribute credit terms and conditions and other typical account information using one or more of autoform bill messaging and inserts, T&Cs, stimulation, generic messaging, and newsletter. Client services include managing the client relations with the retail company 234 and developing business requirements for the various client segments. Marketing datamining involves maintenance of a database 184 by the financial institution of historic information about all customers, such as retail companies, credit cards, and utilities, including demographic information and detailed purchasing history. The financial institution 100 maintains this information in an on-line format for a predetermined period of time, such as twelve months, and provides the retail company 234 access to the purchasing history and demographic information for all of the customers of the retail company 234.

In an embodiment of the present invention, customer care involves rendering services to existing customers of the retail company 234. The customer care services include, for example, call routing by voice response unit (VRU), customer inquiry, order entry, order processing, order inquiry, and bill inquiry and adjustment. A VRU managed by and residing with the financial institution 100 is used to route each billing inquiry or other customer service call to the appropriate location. Call routing includes a number of options which deliver the call to the appropriate center and customer service representative, for example, to inquire about products and services offered by the retail company 234, to place or change an order with the retail company 234, to inquire about a bill for a retail company charge, credit card, or telephone charge, and to inquire about the status of an order placed with the retail company 234. Additional VRU/IVR capabilities include skill based routing in order to quickly deliver the customer call to the appropriate CSR, including a customer care supplier.

In an embodiment of the present invention, customer care services include customer inquiries, service provisioning, billing adjustments, and database updates. The inquiries service involves receiving customer requests for information determining the customer's request, and answering the inquiries. Receiving requests for information involves identifying the customer's account and accessing account information. Determining the customer request involves identifying the customer's request, determining applicable business rules, and authorizing the customer request. Answering inquiries involves providing a response (e.g., verbal, VRU, mail, or e-mail) and transferring the customer 110 to the appropriate customer care supplier. Provisioning services includes receiving requests for services from customers, quality accounts for services requested, and provisioning requests for additional services. Receiving requests for services from customers involves identifying the customer account and accessing account information. Quality accounts for services requested includes accepting or rejecting requests. Provisioning requests for additional services includes forwarding service orders to service providers and accessing service provider systems and executing orders. The customer care system includes scripting, workflow (inter-enterprise), comments record, full text search, imaging, Web-based customer access, and electronic mail response management.

FIG. 4 is a table which illustrates other financial institution software applications and software modules of computer systems 114 coupled to one another in an application for an embodiment of the present invention. Referring to FIG. 4, the fulfillment system 166 fulfills customers' requests for collateral product information and sends notices to customers, such as confirmation of customer information changes and disconnect requests. The prospect file 168 stores customer inquiries and generates upsell/cross-sell lists for customers. The credit check system 170 stores customer application data, assigns new customer numbers and conducts customer credit checks. The work management system 172 stores customer order data, monitors problem resolution, and generates quality issues data. The disconnect file 174 stores, for example, disconnect data. The vendor methods and procedures database 176 stores record of vendors' methods and procedures. The tax module 178 stores applicable tax information and rates. The format database 180 stores, for example, customers' preferred bill format. The accounts receivable system 182 stores accounts receivable data. FIG. 5 is a table which illustrates additional software applications and modules of computer systems 114 coupled to one another in an application for an embodiment of the present invention. Referring to FIG. 5, the customer record database 184 stores customer information. The vendor order processing system 186 receives order data and processes orders for the vendor's goods/services. The product/service provisioning system 188 provides service turn-on and product fulfillment. The vendor order entry system 190 receives customer orders, such as disconnect orders. The tech/database 192 stores data relating, for example, to disconnect requests and meter re-read requests. The wires and pipes database 194 stores information relative, for example, to meter reads and re-reads. The energy usage database 196 stores information such as customer energy usage. The retail company database 198 stores retail company data, such as applicable affinity points.

Figure 6:
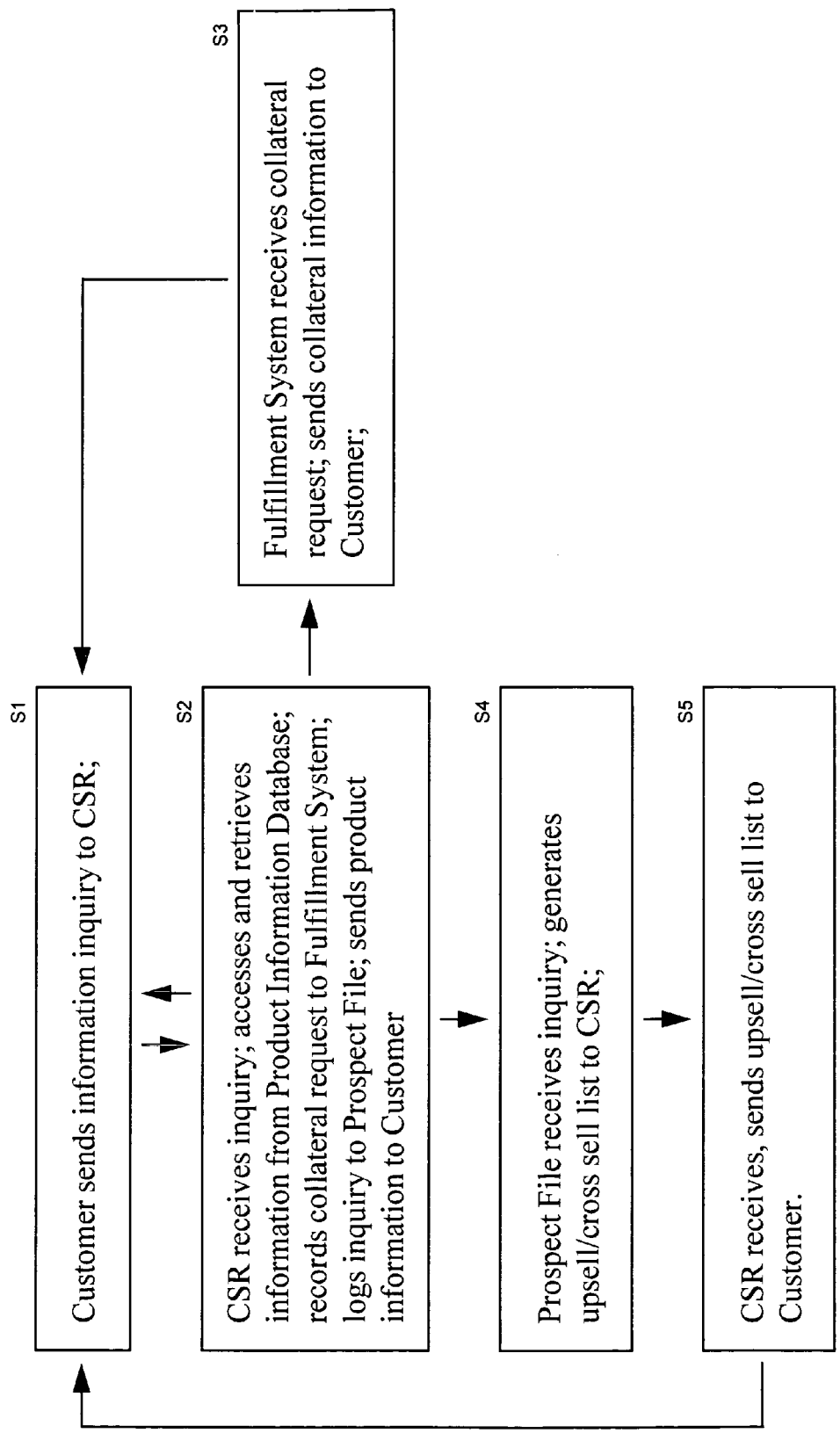
FIG. 6 is a flow chart which provides further detail regarding the process of the customer making an inquiry for an embodiment of the present invention.

In an embodiment of the present invention, customer inquiry involves processing inquiries from the customer 110 or a potential customer for information about the products and services offered, for example, by retail company 234. FIG. 6 is a flow chart which provides further detail regarding the process of customer 110 making an inquiry for an embodiment of the present invention. At S1, the customer 110 sends an inquiry to CSR 101 of the financial institution 100 for information about the products and services offered by the retail company 234, such as by Internet e-mail, telephone (e.g., an 800 number), or postal mail. The request for information is recorded by the CSR 101 and fulfilled. At S2, the CSR 101 receives the inquiry; accesses and retrieves information from the product information database 130. The CSR 101 also records a collateral request to the fulfillment system 166, logs the inquiry to the prospect file 168, and sends the product information to the customer 110. The customer care supplier or fulfillment system 166 fulfills requests for brochures or collateral information of the retail company 234. At S3, the fulfillment system 166 receives the collateral request and sends collateral information to the customer 110. At S4, the prospect file 168 receives the inquiry and generates an upsell/cross sell list to the CSR 101. The CSR 101 receives the upsell/cross sell list and sends it to the customer 110 at S5.

Figure 7:
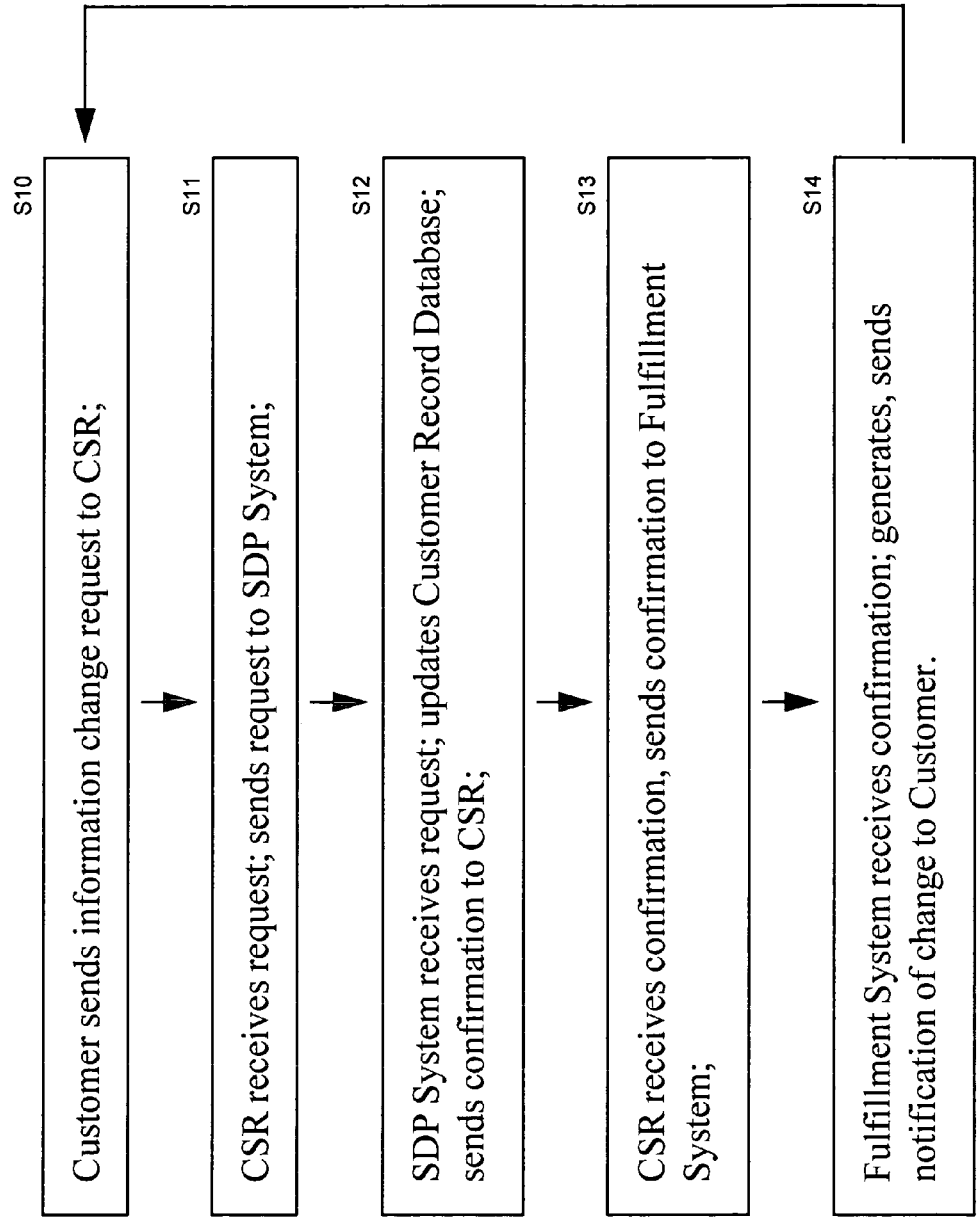
FIG. 7 is a flow chart which provides further detail of the process of changing customer information for an embodiment of the present invention.

In an embodiment of the present invention, customer inquiry functions also include customer information updates and changes to the customer master record 126, such as name, address, and contact information. FIG. 7 is a flow chart which provides further detail of the process of changing customer information for an embodiment of the present invention. Changes to existing customer information are recorded and sent as an update message to the affected suppliers of products and/or services to the customer 110. Updates to customer master records 126 are synchronized between the order entry system 116 of the retail company and the SDP system 162 of the financial institution 100. Referring to FIG. 7, the customer 110 sends a customer information change request to the CSR 101 at S10. At S11, the CSR 101 receives and sends the request to the financial institution's customer profile system or SDP System 162. The SDP system 162 receives the request, updates the customer record database 184, and sends confirmation to the CSR 101 at S12. At S13, the CSR 101 receives and sends the confirmation to the fulfillment system 168. The fulfillment system 168 receives the confirmation and generates and sends a notification of the change to the customer 110 at S14.

In an embodiment of the present invention, order entry is the process of taking a new order or modifying an existing order for any of the products or services of the retail company 234, including credit card and telephony products in a bundle. The order system 116 of the financial institution 100 captures order data from individual customer contacts by telephone (e.g., an 800 number), Internet e-mail, or postal mail, and includes data elements describing the customer 110, each product and service ordered, and the form of payment. The exact data elements to be captured for each product and service are defined by agreement with the retail company 234. The orders database 136 stores the required information on each order and the status of each component within the complete order.

In an embodiment of the present invention, the data elements stored by database 136 include order number, customer number, date ordered (and effectivity dates), and a list of bundles, products, and/or components ordered. Data elements also include method of payment (invoice, credit card), billing preference (separate or combined bill, paper fax, or electronic bill), order status for each component ordered, including supply chain vendor number, supply chain vendor order number, and order status, and detailed information required for each component, such as phone number for long distance, address for electricity, etc. The data elements further include pricing information (and effective dates) for each component ordered and the discount to be applied for any bundles. The system uses a data model with a relationship between the customer 110, orders, bundles, product, component, and discount. The relationship between these tables describes which customers purchased which retail company's bundles, products, and/or components. The customer 110 can place an order to purchase one or more bundles, products, or components. Bundles and products enable the retail company 234 to combine one or more services into a single offering. Products are defined as one or more components and bundles are defined as one or more products. Bundle and product pricing is the sum of the prices of all the components within the bundle/product minus any discount applied for purchasing a bundle.

Figure 23:
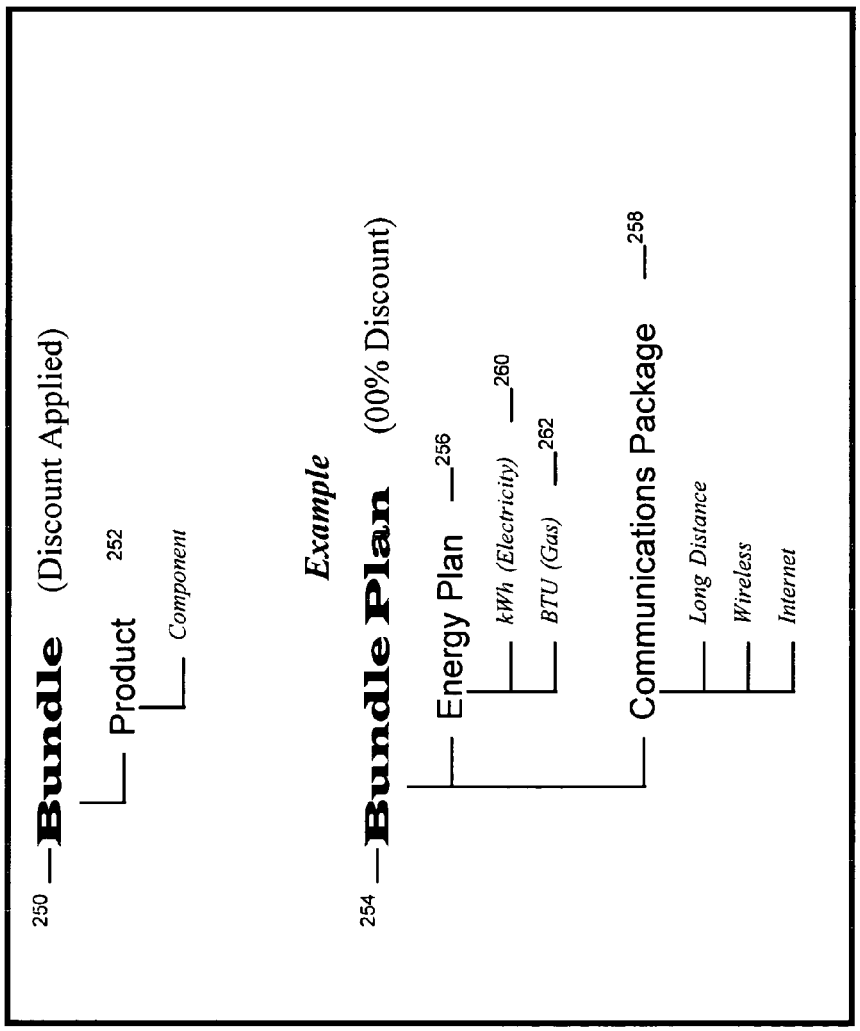
FIG. 23 is a schematic diagram which illustrates the relationship between bundles, products, and components for an embodiment of the present invention.
Figure 28:
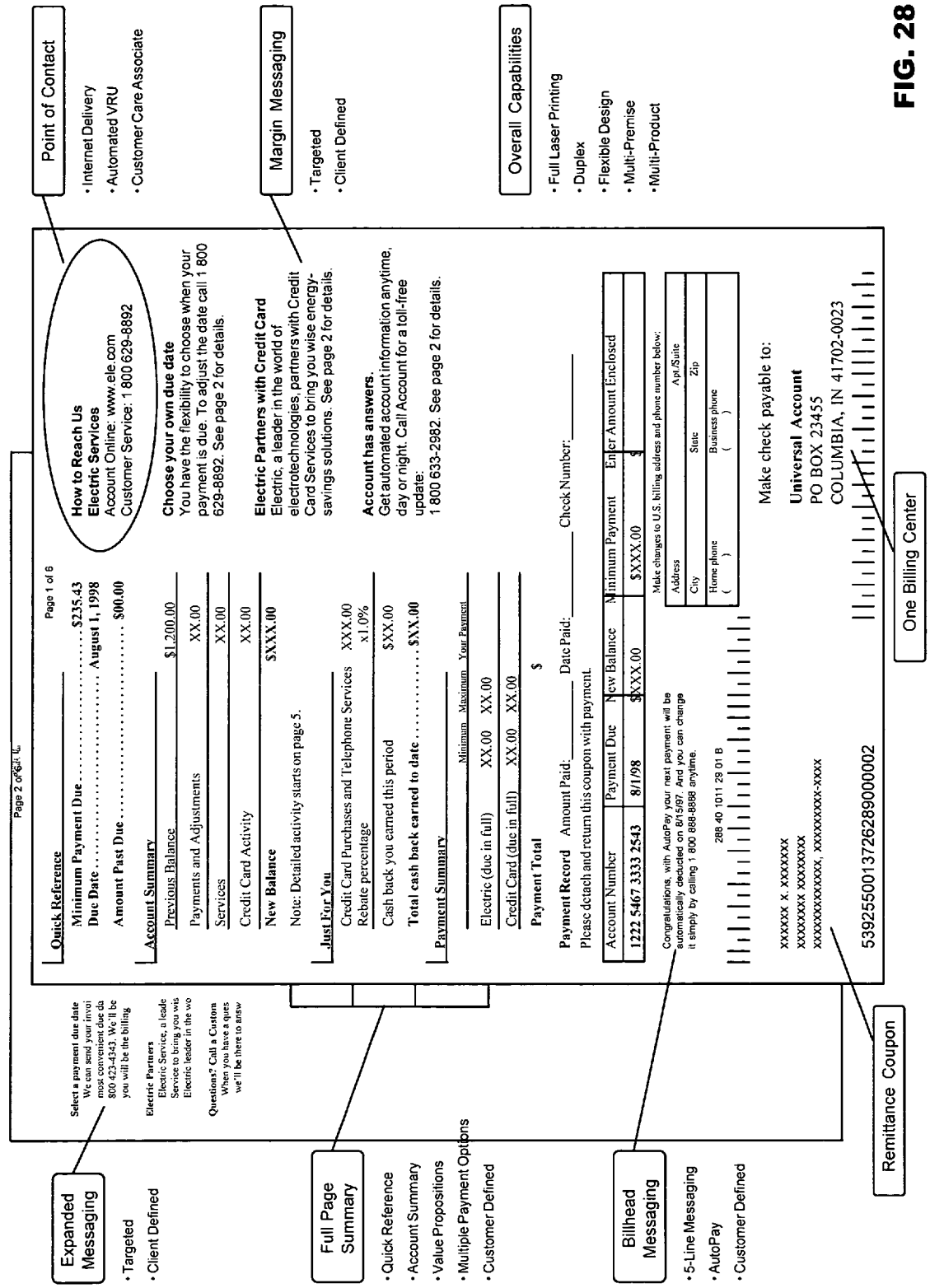
Figure 29:
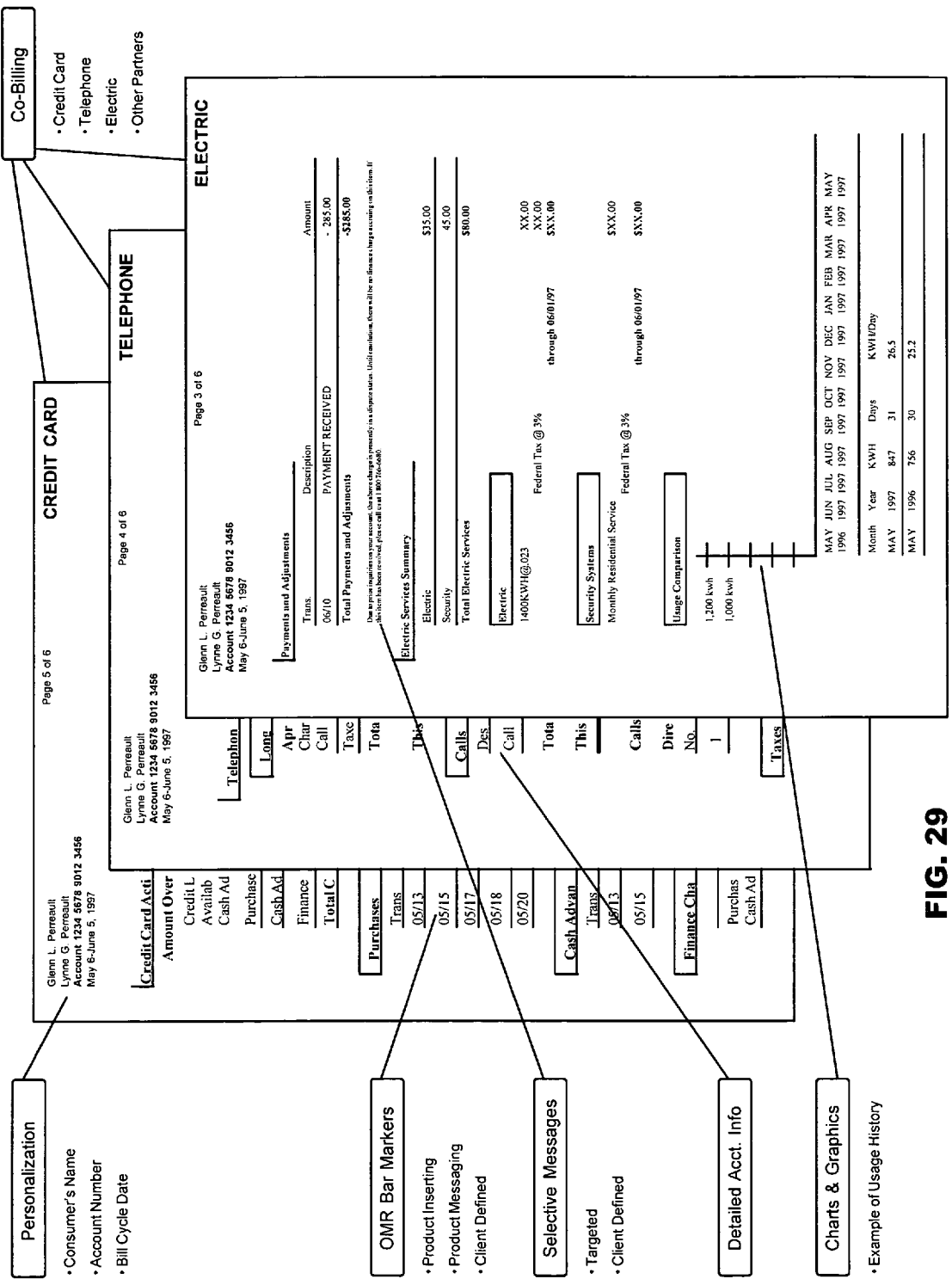

FIG. 23 is a schematic diagram which illustrates the relationship between bundles, products, and components for an embodiment of the present invention. Referring to FIG. 23, a bundle 250 is a combination of one or more products 252. For example, a bundle, 'Bundle Plan' 254, is made up of the two products, 'Energy Plan' 256 and a communications package 258. The retail company 234 can also define a bundle such as 'Energy Offer' that includes only the product 'Energy Plan' 254. The reason that the retail company 234 does this is to apply a discount on the energy (discounts are only applied at the bundle level). The price of a bundle is the sum of the component prices that make up the products that are included in the bundle minus a flat percentage discount applied to all non-financial institution, non-telephone components in the bundle. Telephone and financial institution products can be included in the bundle, but the price of those items is not discounted. The information relating to bundles includes, for example, bundle name, list of products that make up the bundle, effective date and expiration date, discounts applied, and customer eligibility defining the types and classes of customers that are allowed to purchase the bundle.

In an embodiment of the present invention, electricity and gas can be combined into a retail company product or energy plan. This energy product is combined, for example, into a bundle with a communications product to create a bundle plan. When a customer purchases the bundle plan, service requests are sent based on each component being purchased. For example, for five components, a total of five service requests are sent for one order including requests to the power company for electrical service, the gas company for gas service, the long distance company for long distance service, the wireless phone company for digital cellular service, and to the Internet service provider for dial-up Internet service. The price of such a bundle plan is the sum of the price of each component minus a discount applied at the bundle level to any non-financial institution, non-telephone company component. In this example, electricity and gas receives a predetermined percentage discount. The retail company bundle discount is not applied to the credit card charges because they enter the system through another billing stream and are not known to the retail company bill aggregator 124 where the retail company discount is calculated.

In an embodiment of the present invention, components are individual products and services. Each component reflects a single service request to the supply chain vendor 140 for fulfillment. The 'base offering' includes components, such as for energy, telecommunications, home security, credit card, and appliance service contract. The energy component includes, for example, residential electric service and residential gas service. The telecommunications component includes, for example, long distance service, analog cellular service, digital cellular service, Internet access, analog dial-up service, Internet access 64k ISDN service, and Internet access 128k SDN service. Each component has a corresponding entry in the supply chain vendor's systems. When a component is configured, the supply chain vendor 140 that fulfills the order is identified along with the supply chain vendor's 'part number' for this service and all associate charges. This is done to ensure that sufficient information is present in the service request to enable the supply chain vendor 140 to fulfill the order. The "part number" and all charges are the same in both the supply chain vendor's system and in the financial institution's system to insure efficient service delivery and accurate pricing. A product includes one or more components. For example, a product such as 'Energy Plan' 256 is made up of the two components, electricity 260 and gas 262. The price of a product is the sum of the component prices that make up that product. There are no product level discounts. The information relating to products includes the product name, a list of components that make up the product, effective date and expiration date, and the customer eligibility defining the types and classes of customers that are allowed to purchase the product.

In an embodiment of the present invention, the product configuration management system establishes product ID and definition, establishes customer eligibility to purchase a product, and maintains a hierarchy of items for sale, in respect to offering (more than one product together in a bundle), product (one or more components such as long distance), and component (a characteristic of a lowest-level product such as call waiting). The product configuration management system also establishes bundling relationships for an offer, product, and/or component (inclusive/exclusive), establishes supplier ID (by component), records warranty information (by component), maintains unit of sales definition, and establishes acceptable payment methods. The product configuration management system maintains sales price(s) by unit at various levels, such as one-time fee(s), periodic or recurring fees (all periods), tiered, terraced, or flat prices, penalty, rebate, disconnect and/or last-time charge, and applicable tax jurisdiction.

In an embodiment of the present invention, the information required to properly configure each component includes, for example, the name of the component, the supply chain vendor 140 supplying the component, the supply chain vendor's 'part number' for the component, the effective date and expiration date, the customer eligibility which defines the types and classes of customers that are allowed to purchase the component, and the type and rate of all charges, such as first time non-recurring charge (initial), last time non-recurring charge (termination), and recurring charges. Recurring charges include, for example, flat rate, tiered rate (retroactive), and tapered rate (incremental), and the interval at which applied, such as daily, weekly, bimonthly (1st and 15th), monthly, quarterly, semi-annually, annually. Type and rate of charges also include, for example, penalty charges, rebates, and usage based charges (for energy only), such as flat rate, tiered rate (retroactive), tapered rate (incremental), average with true-up, average without true-up, or estimated with true-up. The pricing structure is also reflected in the supply chain vendor's systems to ensure that the charges received match the prices quoted to the customer when purchased. Additional information for properly configuring each component includes unit of measure for usage based charges and minimum data requirements that enable the supply chain vendor 140 to activate service (such as phone number for long distance, address for residential electrical service).

In an embodiment of the present invention, order entry or order capture for products and services involves an initial determination of whether the customer 110 is a new or existing financial institution or retail company customer. If the customer 110 is a customer of both the financial institution 100 and the retail company 234, an electronic request is issued to the financial institution's credit check system 170 to perform a credit check and receive the new customer number. A new customer record is created, and appropriate demographic information is gathered from the customer 110. If the customer 110 is an existing financial institution customer, but a new retail company customer, the customer's credit worthiness is validated with respect to the guidelines provided by the retail company 234. If the request is to order new or additional services, the order from the customer 110 is recorded for any products, services, and/or bundles; the customer 110 is provided with the appropriate discounts and prices; and information required for each product and/or service ordered is recorded. The method of payment, such as invoice or credit card is recorded, the billing preference, for example, combined bill, individual bills, paper or electronic bill, is recorded, and the order is confirmed with the customer 110 and committed within the system. The customer information stored in the order entry system 116 is synchronized with the financial institution customer databases 184.

Figure 8:
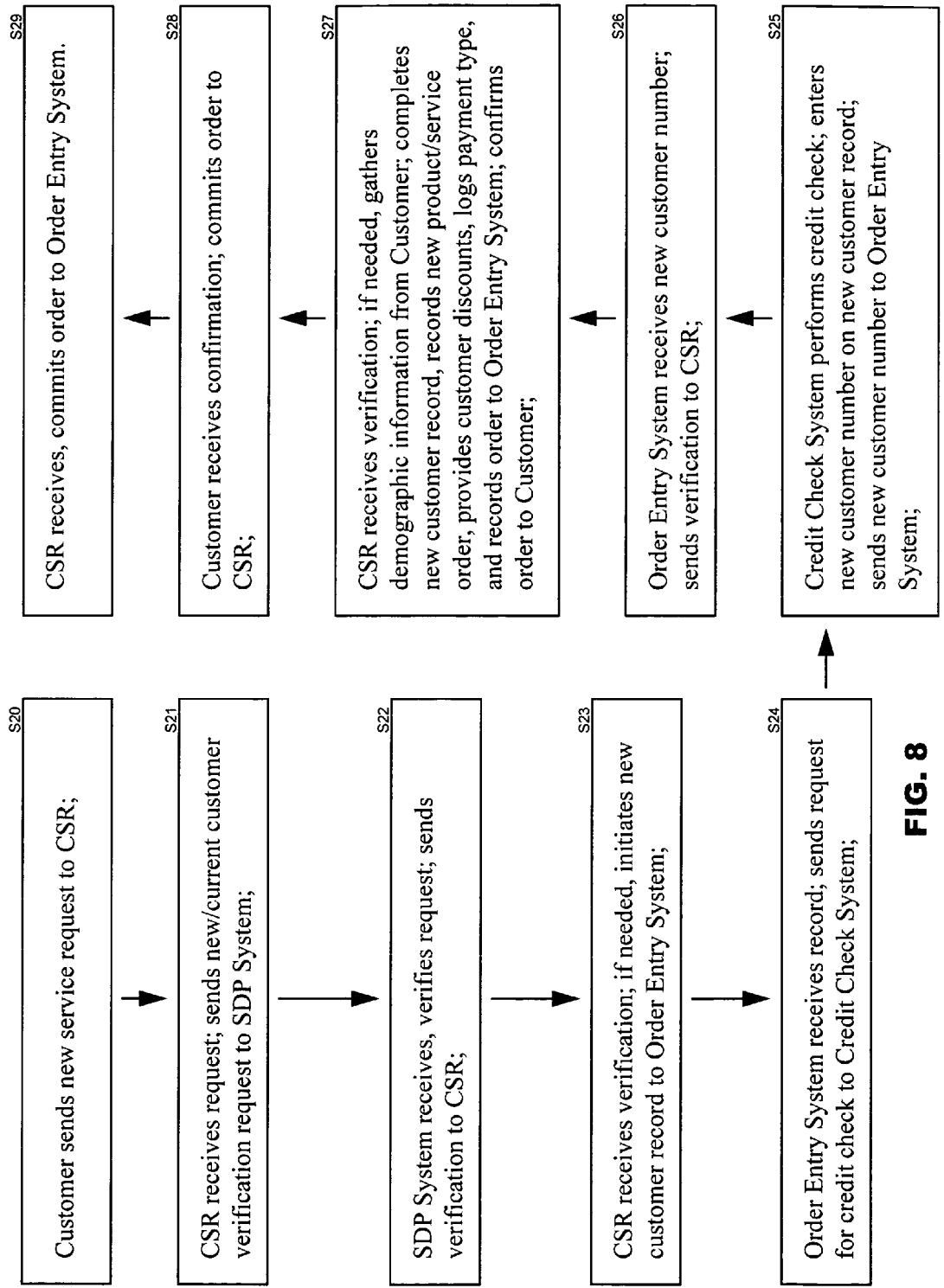
FIG. 8 is a flow chart which provides further detail regarding the process of order entry or order capture for products and services for the customer for an embodiment of the present invention.

FIG. 8 is a flow chart which provides further detail regarding the process of order entry or order capture for products and services for an embodiment of the present invention. The customer 110 sends a request for a new service request to the CSR 101 of the financial institution 100 at S20. At S21, the CSR 101 receives the request and sends a new/current customer verification request to the financial institution's SDP system 162. The SDP system 162 receives and verifies the request and sends a verification to the CSR 101 at S22. At S23, the CSR 101 receives the verification. If needed, the CSR 101 initiates a new customer record to the order entry system 116. At S24, the order entry system 116 receives the new customer record and sends a request for a credit check to the financial institution's credit check system 170. At S25, the credit check system 170 receives the request and performs the credit check. The credit check system 170 also enters a new customer number on the new customer record 184 and returns it with the credit check to the order entry system 116. The order entry system 116 receives the new customer number and sends verification to the CSR 101 at S26. At S27, the CSR 101 receives the verification, and if needed, gathers demographic information from the customer 110. The CSR 101 completes the new customer record 184, records the new product/service order, provides appropriate customer discounts, logs a payment type, and records the order to the order entry system 116. The CSR 101 then confirms the order to the customer 110. At S28, the customer 110 receives the confirmation and commits the order to the CSR 101. The CSR 101 receives and commits the order to the order entry system 116 at S29.

In an embodiment of the present invention, the customer information system 126 maintains, for example, customer identification, such as buyer/customer ID, billing responsibility ID, customer type such as eligibility, profitability, class, and demographics, and an "owned-by" indicator. The customer information system 126 also establishes account(s), which includes billing preference, such as invoice, the Web or other electronic invoice, and cycle, and payment preference, such as credit card, check, or bank debit. Additionally, the customer information system 126 maintains purchasing agreement(s), including product, offering, and components by site, guide, and location, such as home, vacation home, or small business, payment and billing preference, discounts applied, billing cycle, and supplier ID(s). In addition, the customer information system 126 records all purchase transaction history for all goods and/or services. Functionality requirements for supplier and/or information management include merchant ID, vendor ID, contact (e.g., emergency number) and quality performance, such as complaint tracking and issues.

In an embodiment of the present invention, the order processing system 120 generates appropriate service requests for each new order and termination requests for any cancellations within the system and creates a flat file containing this information. A flat file is sent to each supply chain vendor 140 every night indicating all new service requests, modifications, and termination requests for products and services provided by the supply chain vendor 140. This file includes data relative to the action to be performed. Examples of such actions include a request for new service, acknowledgment of receipt of new service request and return of the vendor's order number. Other examples include an error in a new service request with appropriate error code or codes, acknowledgment of new service activation and return of the vendor's order number, a request for termination of service, acknowledgment of receipt of termination request, an error in termination request with error code or codes, and acknowledgment of termination of service. Additional examples include a request for a meter re-read, acknowledgment of receipt of a meter re-read request, and error in meter re-read request with appropriate error code or codes. The flat file also includes the financial institution's or retail company's order number, the supply chain vendor's order number (if known), the supply chain vendor's part number, product specific information required for provisioning, and any other necessary information.

In an embodiment of the present invention, the order processing system 120 verifies existing customers by product, establishes new customers, and enters orders, such as verifying the eligibility of a customer 110 for an offer, a product, and/or a component, establishes a purchase agreement for an offering, a product, and/or a component, and completes "minimum" information required by the offer, the product, and/or the component. The order processing system 120 also reads event notifications or messages to suppliers 140 in batch, such as "start service" notices, "end service" notices, or other notices by product type. The order processing system 120 records billing information and payment preference, verifies the customer's credit worthiness, processes credit card charges, and receives acknowledgments for orders from the supplier 140 in batch. The order processing system 120 also records the supplier's ID and customer number. Additionally, the order processing system 120 records order status updates and returns in them in batch and maintains order status and workflow by offer, product and/or component.

Figure 9:
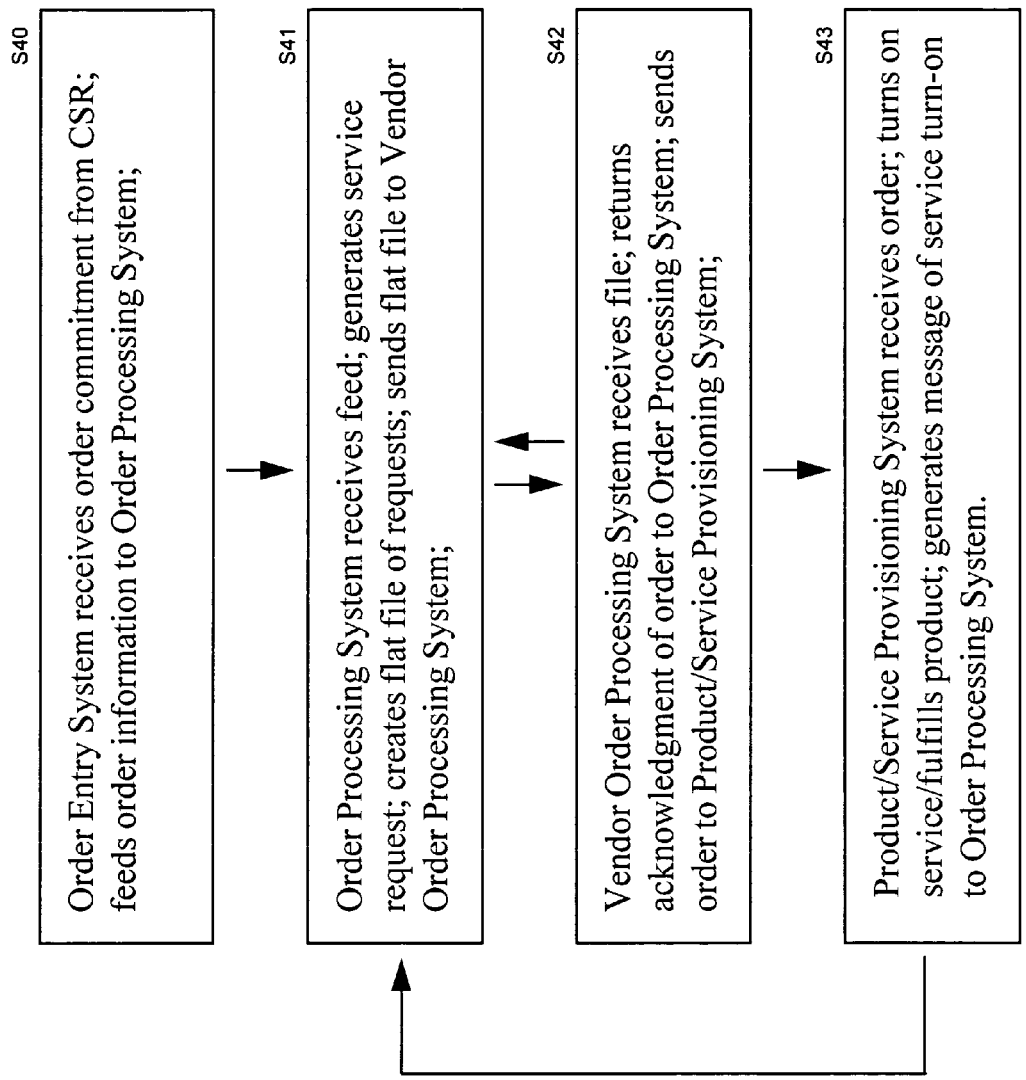
FIG. 9 is a flow chart which provides further detail regarding order processing for the customer for an embodiment of the present invention.

FIG. 9 is a flow chart which provides further detail regarding order processing for an embodiment of the present invention. Referring to FIG. 9, at S40, the order entry system 116 receives the order commitment from CSR 101 and feeds order information to the order processing system 120. At S41, the order processing system 120 receives the feed and generates a service request for the order. The order processing system 120 creates a flat file of the request and sends the flat file to the vendor order processing system 186. The vendor order processing system 186 receives the file, returns an acknowledgment of the order to the order processing system 120, and sends the order to the product/service provisioning system 188 at S42. At S43, the product/service provisioning system 188 receives the order, turns on the service and/or fulfills the product, and generates a message of service turn-on and/or product fulfillment to the order processing system 120.

Figure 10:
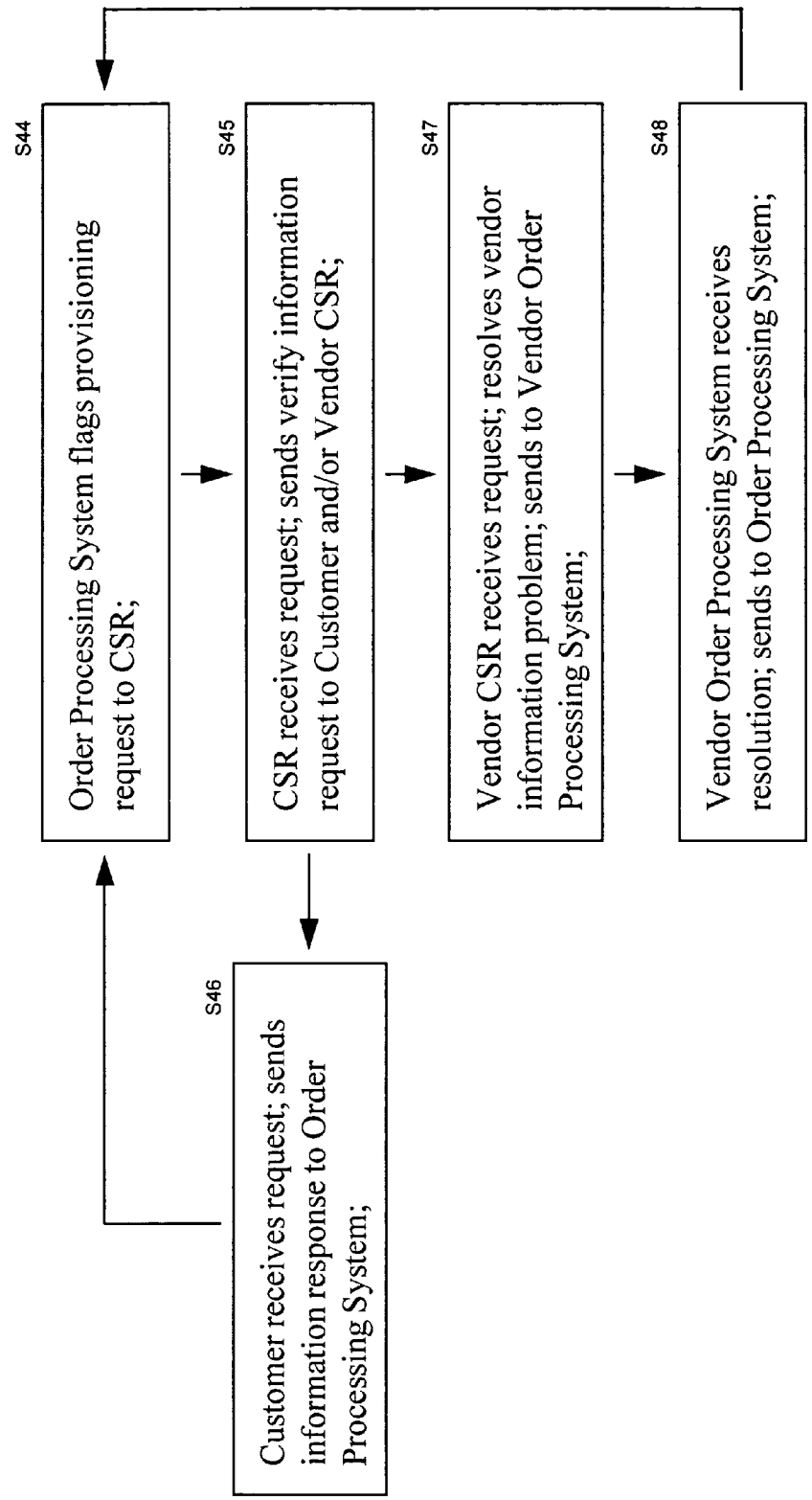
FIG. 10 is a flow chart which provides further detail regarding the order processing flag process when no acknowledgment of an order for the customer is returned to the order processing system, for an embodiment of the present invention.

FIG. 10 is a flow chart which provides further detail regarding the order processing flag process when no acknowledgment of an order is returned to the order processing system 120, for an embodiment of the present invention. Referring to FIG. 10, at S44, the order processing system 120 flags the provisioning request to the CSR 101. The CSR 101 receives the request and sends a verify information request to the customer 110 and/or the vendor CSR 238 at S45. At S46, the customer 110 receives the request and sends an information response to the order processing system 120. At S47, the vendor CSR 238 receives the request, resolves the vendor information problem, and sends a notice of the resolution to the vendor order processing system 186. The vendor order processing system 186 receives and sends the notice to the order processing system 120 at S48.

In an embodiment of the present invention, in the order inquiry process, the customer 110 sends inquires about any existing order for any reason to the CSR 101 via telephone, e-mail, fax, or postal mail. The CSR 101 provides any information regarding orders that is available to the CSR 101 via the order entry system 116 and any other on-line or printed documentation. The CSR 101 hands off emergency inquiries, such as gas leaks or power outages, to the supply chain vendor 140 or its designate. If the inquiry cannot be resolved by the CSR 101, the inquiry is routed to the supply chain vendor 140 for completion. All inquiries are recorded and tracked to ensure closure, to enable monitoring of the support required for each product, service, and supply chain vendor 140, and to maintain and report quality issues on each product, service, and the supply chain vendor. Each service request is tracked until an acknowledgment is received from the supply chain vendor 140, for example, via a flat file, indicating an acceptable order, and the supply chain vendor's order number is recorded. The supply chain vendor 140 notifies the financial institution 100 of invalid service requests by returning an acknowledgment code indicating the source of error. The financial institution 100 flags provisioning requests that have not been acknowledged and schedules a follow-up to resolve any issues.

Figure 11:
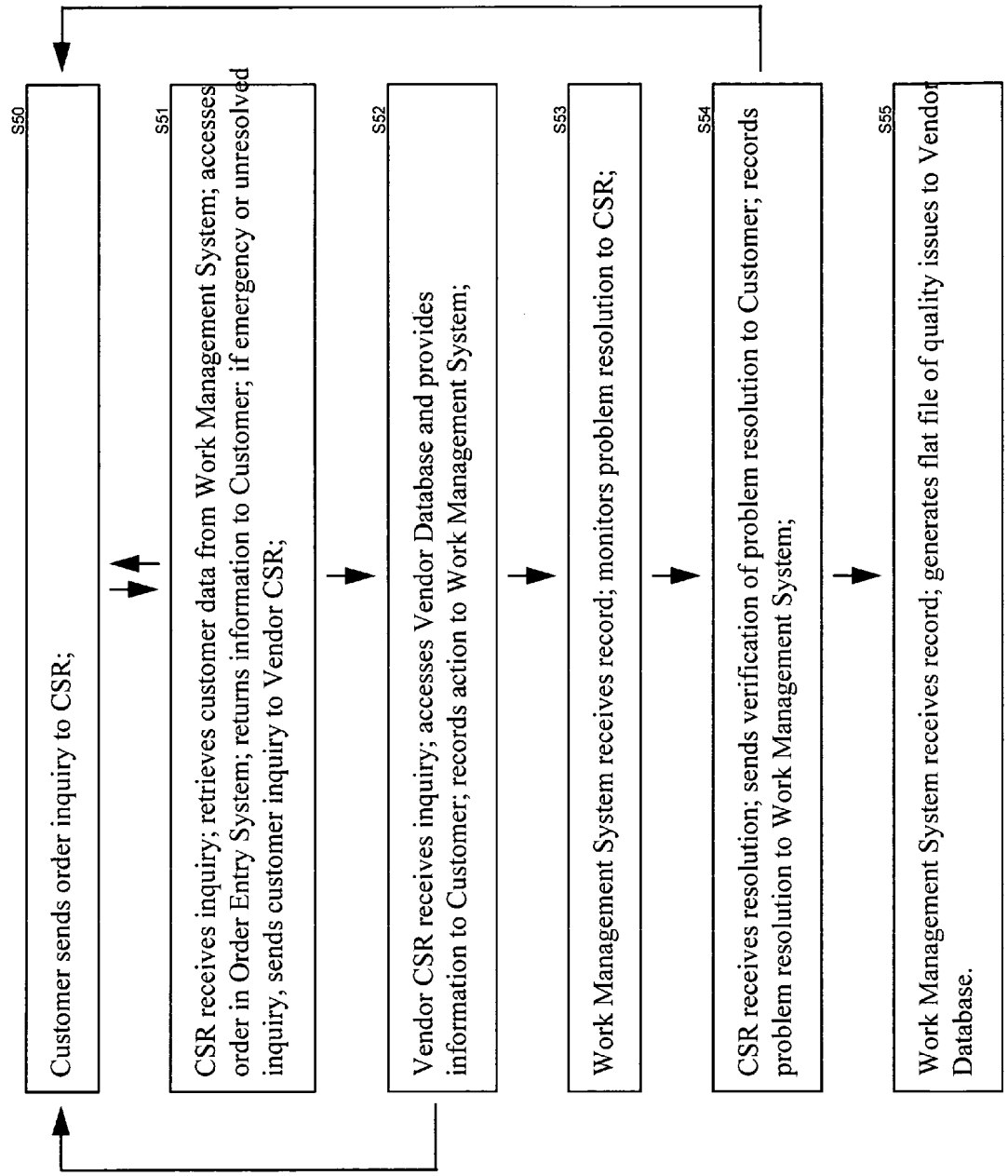
FIG. 11 is a flow chart which provides further detail of the process of the customer inquiring about an order for an embodiment of the present invention.

FIG. 11 is a flow chart which provides further detail of the process of the customer 110 inquiring about an order for an embodiment of the present invention. Referring to FIG. 11, the customer 110 sends an order inquiry to the CSR 101 at S50. At S51, the CSR 101 receives the inquiry, retrieves customer data from the work management system 172, accesses the order in the order entry system 116, and returns the requested information to the customer 110. If the inquiry relates to an emergency or cannot be resolved by the CSR 101, the CSR 101 sends the customer inquiry to the vendor CSR 238. At S52, the vendor CSR 238 receives the inquiry, accesses the vendor database 199 and provides the information to the customer 110, and records the action to the work management system 172. The work management system 172 receives the record and monitors the problem resolution to the CSR 101 at S53. The CSR 101 receives the resolution, sends verification of the problem resolution to the customer 110, and records the problem resolution to the work management system 172 at S54. At S55, the work management system 172 receives the record and generates a flat file of quality issues to the vendor database 199.

In an embodiment of the present invention, if the purpose of the call is to cancel or modify any currently purchased products or services, the products and/or services to be canceled are recorded. If the products were part of a bundled offering, a determination is made as to whether the bundle is still valid for the remaining products and/or services. If the bundle is now invalid, the customer 110 is informed of his or her options, such as the next closest bundled offering to the current products and services being purchased, the price of purchasing the remaining products and services separately, and up-selling the customer 110 to other bundles that may provide more value to the customer 110 by purchasing additional products and/or services from the retail company 234. Additionally, the customer 110 is provided the appropriate discounts and prices on the products, services, and/or bundled offerings purchased. Further, the information required for each new product and/or service ordered is recorded, the method of payment, such as invoice or credit card is recorded is recorded, and the billing preference, for example, combined bill, individual bills, paper or electronic bill, is recorded. Thereafter, the order is confirmed with the customer 110 and committed within the system. When the order is committed to the system, the order records reflect the correct products, services, and discounts for use by the billing modules.

Figure 12:
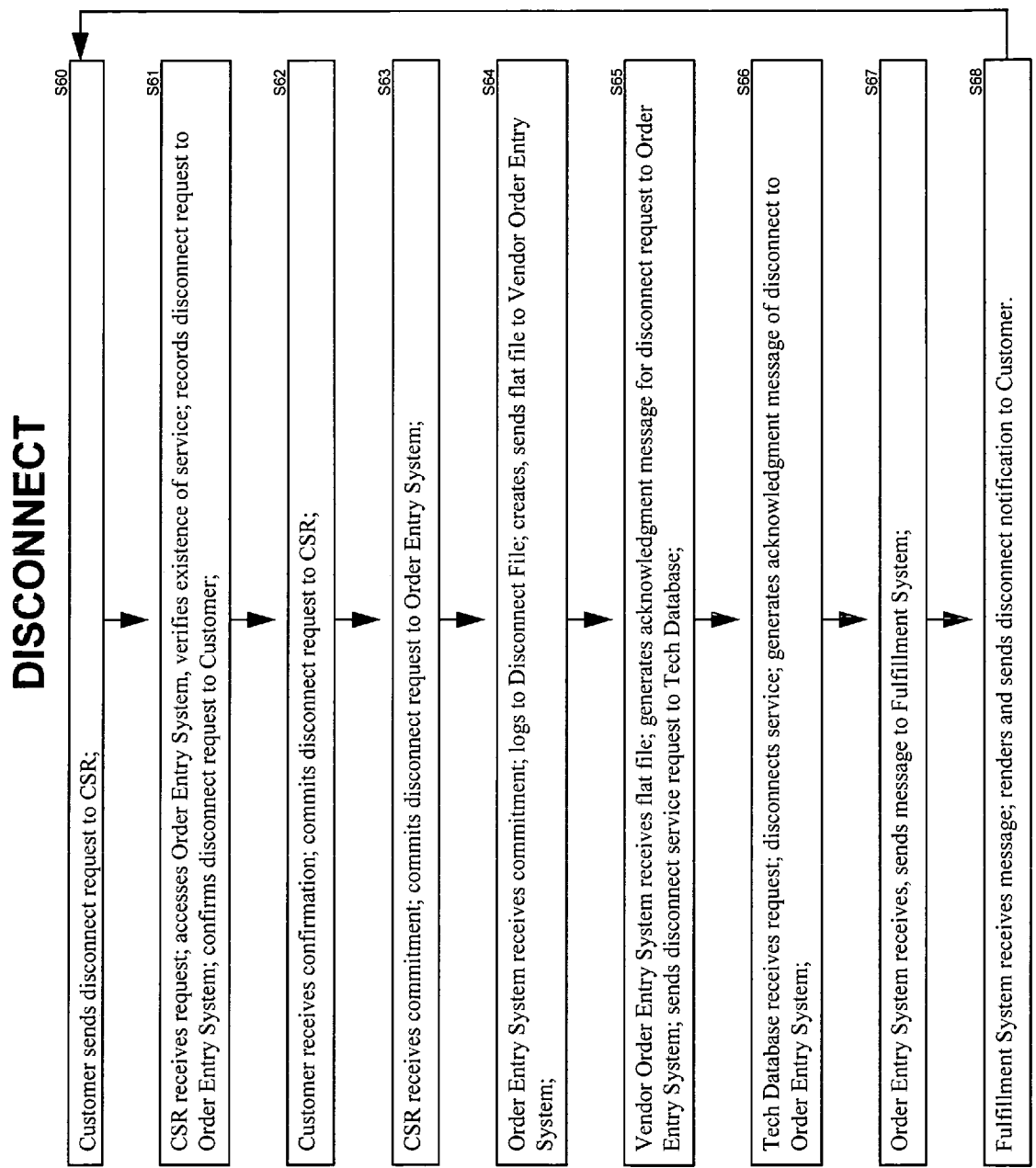
FIG. 12 is a flow chart which provides further detail regarding the process of the customer requesting cancellation of a currently purchased product or service, for an embodiment of the present invention.

FIG. 12 is a flow chart which provides further detail regarding the process of the customer 110 requesting the CSR 101 to cancel a currently purchased product or service, for an embodiment of the present invention. Referring to FIG. 12, the customer 110 sends a disconnect request to the CSR 101 at S60. At S61, the CSR 101 receives the request and accesses the order entry system 116 and verifies the existence of the service. The CSR 101 records the disconnect request to the order entry system 116 and confirms the disconnect request to the customer 110. At S62, the customer 110 receives the confirmation and commits the disconnect request to CSR 101. The CSR 101 receives the commitment and commits the disconnect request to the order entry system 116 at S63. The order entry system 116 receives the commitment, logs the request to the disconnect file 174 and creates and sends a flat file for the request to the vendor order entry system 190 at S64. At S65, the vendor order entry system 190 receives the flat file, generates an acknowledgment message to the order entry system 116, and sends the disconnect service request to the tech/database 192. The tech/database 192 receives the request, disconnects the service, and generates an acknowledgment message to the order entry system 116 at S66. The order entry system 116 receives the acknowledgment and sends a disconnect message to the fulfillment system 166 at S67. At S68, the fulfillment system 166 receives the message and renders and sends a disconnect notification to the customer 110.

Figure 13:
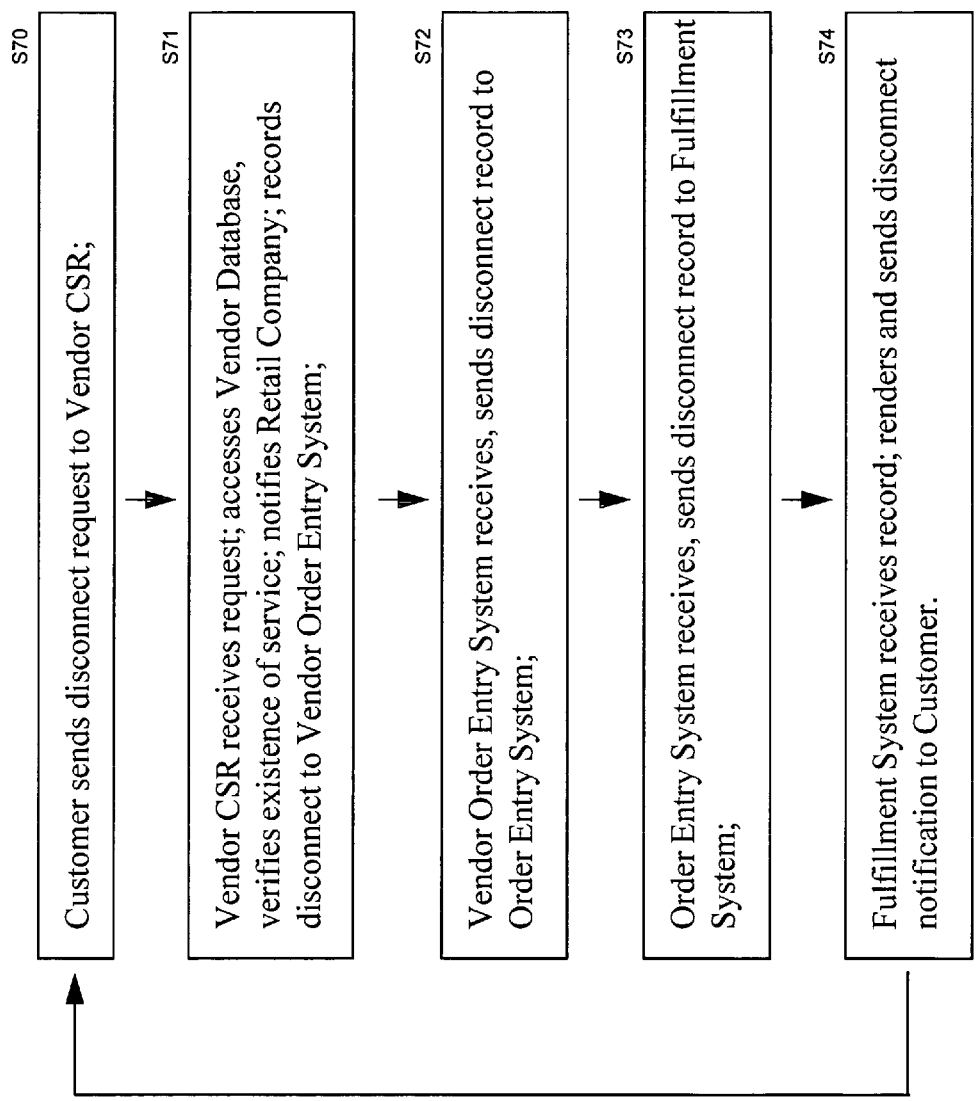
FIG. 13 is a flow chart which provides further detail regarding an alternative process of the customer requesting a cancellation of a currently purchased product or service for an embodiment of the present invention.

FIG. 13 is a flow chart which provides further detail regarding the process of the customer 110 requesting the vendor CSR 238 to cancel a currently purchased product or service for an embodiment of the present invention. Referring to FIG. 13, the customer 110 sends the disconnect request to the vendor CSR 238 at S70. At S71, the vendor CSR 238 receives the request, accesses the vendor database 199 and verifies the existence of the service. The vendor CSR 238 notifies the retail company 234 and records the disconnect request to vendor order entry system 190. At S72, the vendor order entry system 190 receives and sends the disconnect record to the order entry system 116. The order entry system 116 receives and sends the disconnect record to the fulfillment system 166 at S73. At S74, the fulfillment system 166 receives the record and renders and sends a disconnect notification to the customer 110.

In an embodiment of the present invention, bill inquiry and adjustments is the process of the customer 110 sending billing questions or a request for a billing adjustment to the CSR 101, and the CSR 101 bringing the matter to a satisfactory conclusion. If the billing inquiry is regarding credit card charges and/or telephone long distance charges, the inquiry is routed by the VRU to the financial institution's customer care 166. If the billing inquiry relates to energy charges, the CSR 101 retrieves an image of the bill from the financial institution's U-bill system 164. The CSR 101 reviews the bill data with the customer 110 and determines if the rate is incorrect or if the usage appears to be incorrect. If the rate is incorrect, the CSR 101 corrects the rate in the customer's order and adjusts the bill accordingly within the energy bill calculation system 146. If the usage appears incorrect, an "in dispute" message is sent to the financial institution's system, and the CSR 101 requests a meter re-read from the energy supplier or meter reading vendor.

When the re-read is received, the new usage data is processed by the energy bill calculation module 146 to correct the total amount due.

Figure 14:
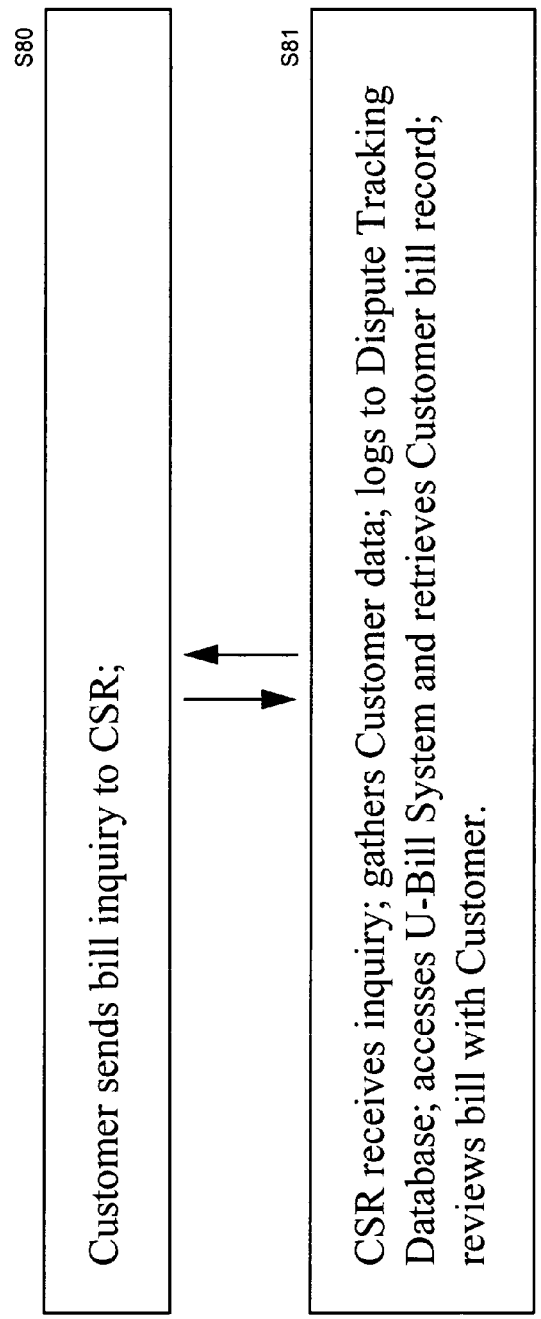
FIG. 14 is a flow chart which provides further detail regarding the process of a customer bill inquiry and adjustment request regarding energy usage for an embodiment of the present invention.
Figure 15:
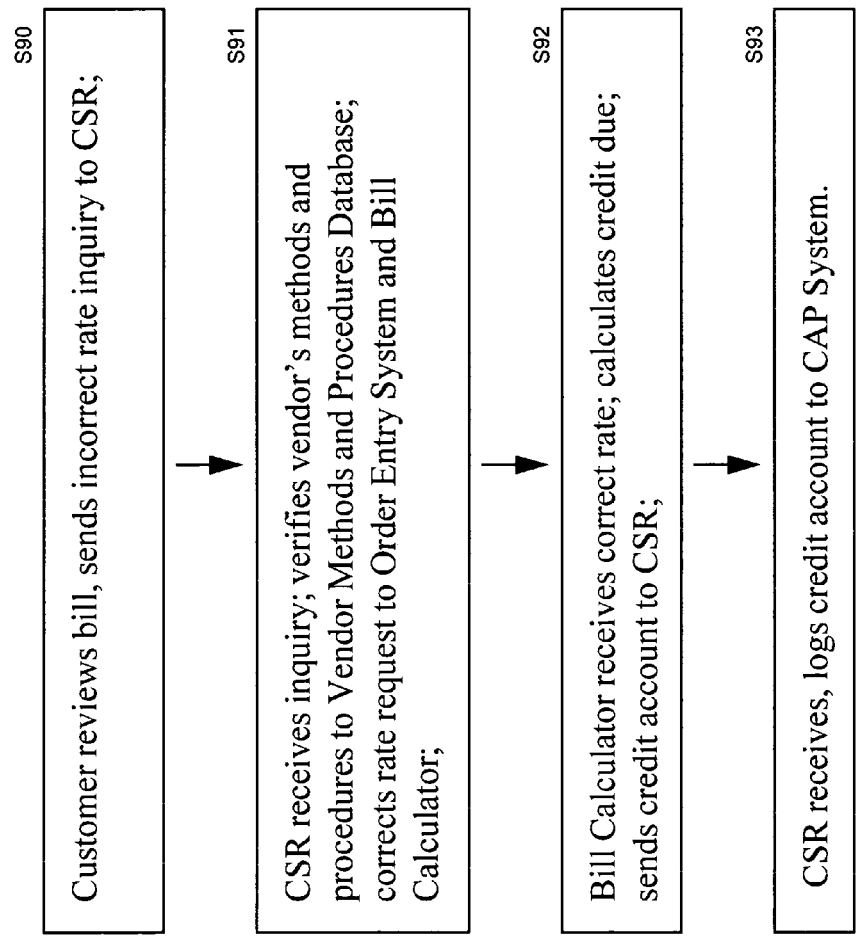
FIG. 15 is a flow chart which provides further detail regarding the process of a customer bill inquiry and adjustment request regarding energy usage, where the inquiry relates to an incorrect rate, for an embodiment of the present invention.

FIG. 14 is a flow chart which provides further detail regarding the process of the customer 110 presenting a bill inquiry and adjustment regarding energy usage for an embodiment of the present invention. Referring to FIG. 14, the customer 110 sends a bill inquiry to the CSR 101 at S80. At S81, the CSR 101 receives the inquiry, gathers customer data, and logs the inquiry to the dispute tracking database 122. The CSR 101 also accesses the U-bill system 164, retrieves the customer bill record, and reviews the bill with the customer 110. FIG. 15 is a flow chart which provides further detail regarding the process of bill inquiry and adjustment regarding energy usage where the inquiry relates to an incorrect rate, for an embodiment of the present invention. Referring to FIG. 15, at S90, the customer 110 reviews the bill and sends an incorrect rate inquiry to the CSR 101. At S91, the CSR 101 receives the inquiry, verifies the vendor's methods and procedures from the vendor methods and procedures database 176, and sends a correct rate request to the order entry system 116 and the bill calculator 146. The bill calculator 146 receives the correct rate, calculates a credit due, and sends a credit to account to the CSR 101 at S92. At S93, the CSR 101 receives and logs the credit account to the CAP system 142.

Figure 16:
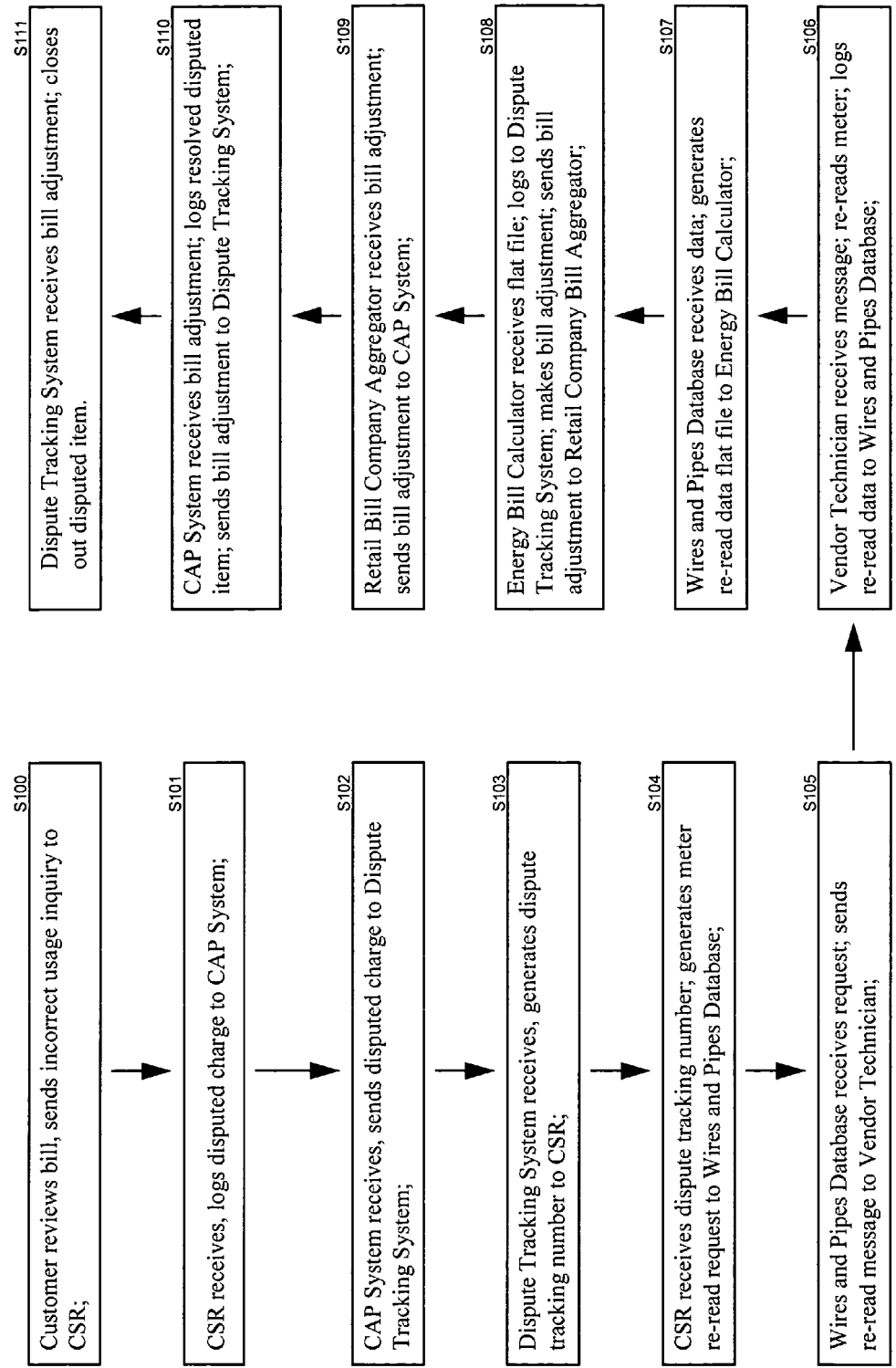
FIG. 16 is a flow chart which provides further detail regarding the process of a customer bill inquiry and adjustment request regarding energy usage, where the inquiry relates to incorrect usage, for an embodiment of the present invention.

FIG. 16 is a flow chart which provides further detail regarding the process of bill inquiry and adjustment regarding energy usage where the inquiry relates to incorrect usage for an embodiment of the present invention. Referring to FIG. 16, the customer 110 reviews the bill and sends an incorrect usage inquiry to the CSR 101 at S100. At S101, the CSR 101 receives and logs the disputed charge to the CAP system 142. The CAP system 142 receives and sends the disputed charge to the dispute tracking system 122 at S102. The dispute tracking system 122 receives the disputed charge and generates a dispute tracking number to the CSR 101 at S103. The CSR 101 receives the dispute tracking number and generates a meter re-read request to the wires and pipes database 194 at S104. The wires and pipes database 194 receives the request and sends a re-read message to a vendor technician at S105. The vendor technician receives the message, re-reads the meter and logs the re-read data to the wires and pipes database 194 at S106. The wires and pipes database 194 receives the data and generates a re-read data flat file to the energy bill calculator 146 at S107. At S108, the energy bill calculator 146 receives the flat file, logs to the dispute tracking system 122, makes a bill adjustment, and sends the bill adjustment to the retail company bill aggregator 124. The retail bill company aggregator 124 receives the bill adjustment and sends the bill adjustment to the CAP system 142 at S109. The CAP system 142 receives the bill adjustment, logs the resolved disputed item, and sends the bill adjustment to the dispute tracking system 122 at S110. At S111, the dispute tracking system 122 receives the bill adjustment and closes out the disputed item.

In an embodiment of the present invention, the billing adjustment system receives requests for billing adjustments, qualifies requests for billing adjustment, and applies billing adjustment. When a billing adjustment request is received, the customer account is identified and account information is accessed. Qualification of the request for billing adjustment includes determining applicable business rules and authorizing the adjustment request. Applying the billing adjustment involves forwarding the adjustment to the appropriate provider's billing system, accessing the provider's billing system and applying the adjustment. Database updates include updating the customer care supplier's database with the inquiry information and provisioning information. Billing inquiry and adjustments involve processing energy bill inquiries and processing non-energy dispute resolution and issuing messages to third-party vendors. Processing energy bill inquiries includes recording the type of inquiry, determining the source of the billing error, and corrective options, such as correcting the rate in the energy bill calculation module 146, determining bill adjustments and/or reissue processes, and issuing messages to discount companies and/or meter companies to re-read meters, including establishing opening workflow items, and processing re-read meter/energy adjustments.

In an embodiment of the present invention, if the billing inquiry relates to non-energy retail company charges, the CSR 101 retrieves an image of the bill from the financial institution's U-bill system 164 and reviews the bill data with the customer 110 to determine if and which item is in dispute and what the customer 110 contends the correct charge should be. Based on the vendor's methods and procedures 176, the CSR 101 attempts to resolve the issue. Should an adjustment be made at this time, the CSR 101 enters the adjustment in the order entry system 116, which then notifies the supply chain vendor 140 of the change. The supply chain vendor 140 changes the customer's class of service in its database and sends an acknowledgment of the change to the financial institution 100. If the CSR 101 cannot resolve the customer concern, the disputed charge is logged in both the financial institution's CAP system 142 and in the dispute tracking system 122, which then notifies the order entry system 116 and the supply chain vendor 140. The supply chain vendor 140 is then responsible for satisfying the dispute and notifying the financial institution 100 of the resolution for processing within CAP system 142. The resulting action appears on the next bill to the customer 110.

Figure 17:
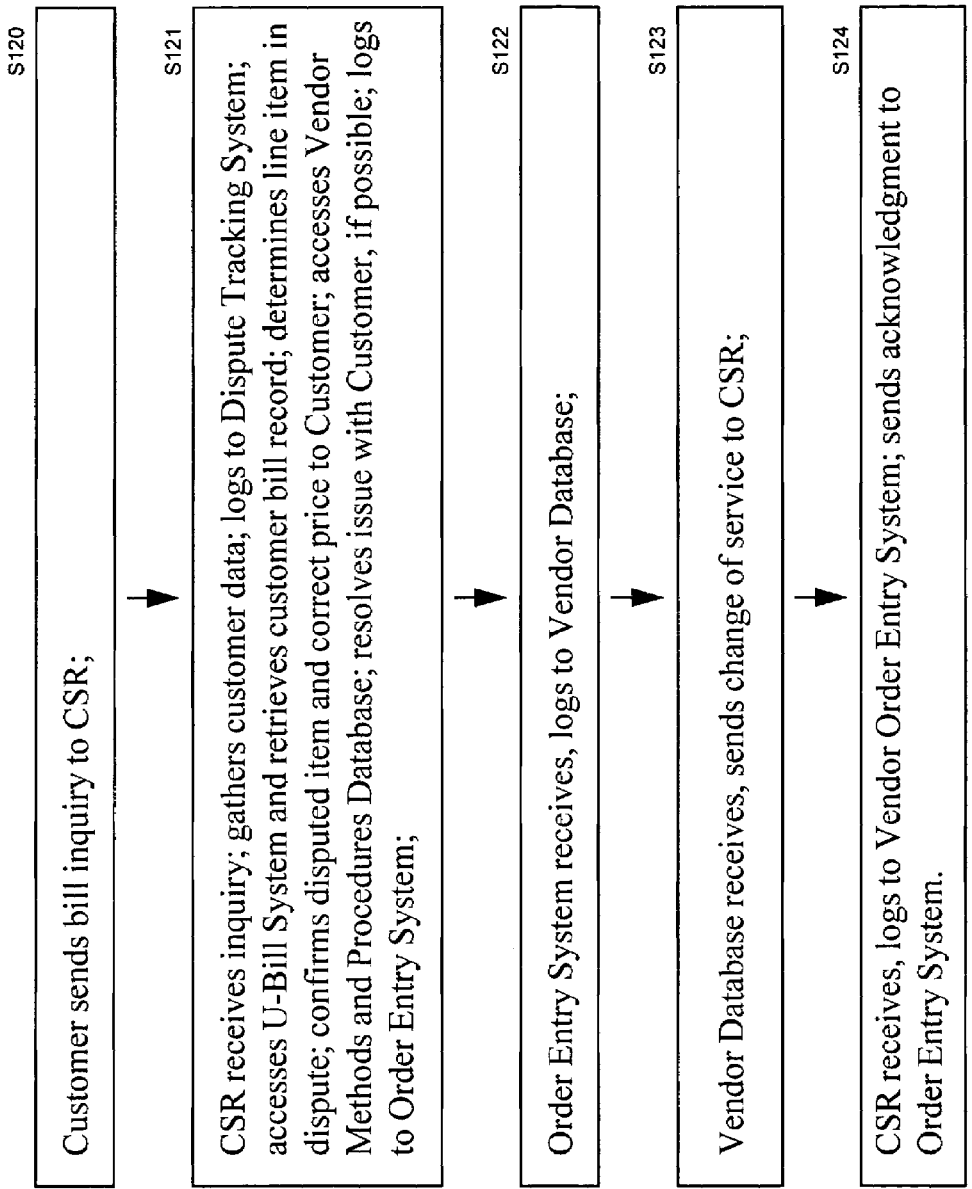
FIG. 17 is a flow chart which provides further detail regarding the process of the customer inquiring about a bill adjustment relating to a non-energy retail company product for an embodiment of the present invention.

FIG. 17 is a flow chart which provides further detail regarding the process of the customer 110 inquiring about a bill adjustment relating to a non-energy retail company product for an embodiment of the present invention. Referring to FIG. 17, the customer 110 sends a bill inquiry to the CSR 101 at S120. At S121, the CSR 101 receives the inquiry, gathers customer data and logs the inquiry to the dispute tracking system 122. The CSR 101 also accesses the U-bill system 164, retrieves the customer bill record, determines the line item in dispute, and confirms the disputed item and correct price to the customer 110. The CSR 101 accesses the vendor methods and procedures database 176, resolves the issue with the customer 110, if possible, and logs to the order entry system 116. At S122, the order entry system receives and logs to the vendor database 199. At S123, the vendor database 199 receives and sends a change of service to the CSR 101. At S124, the CSR 101 receives, logs to the vendor order entry system 190, and sends an acknowledgment to the order entry system 116.

Figure 18:
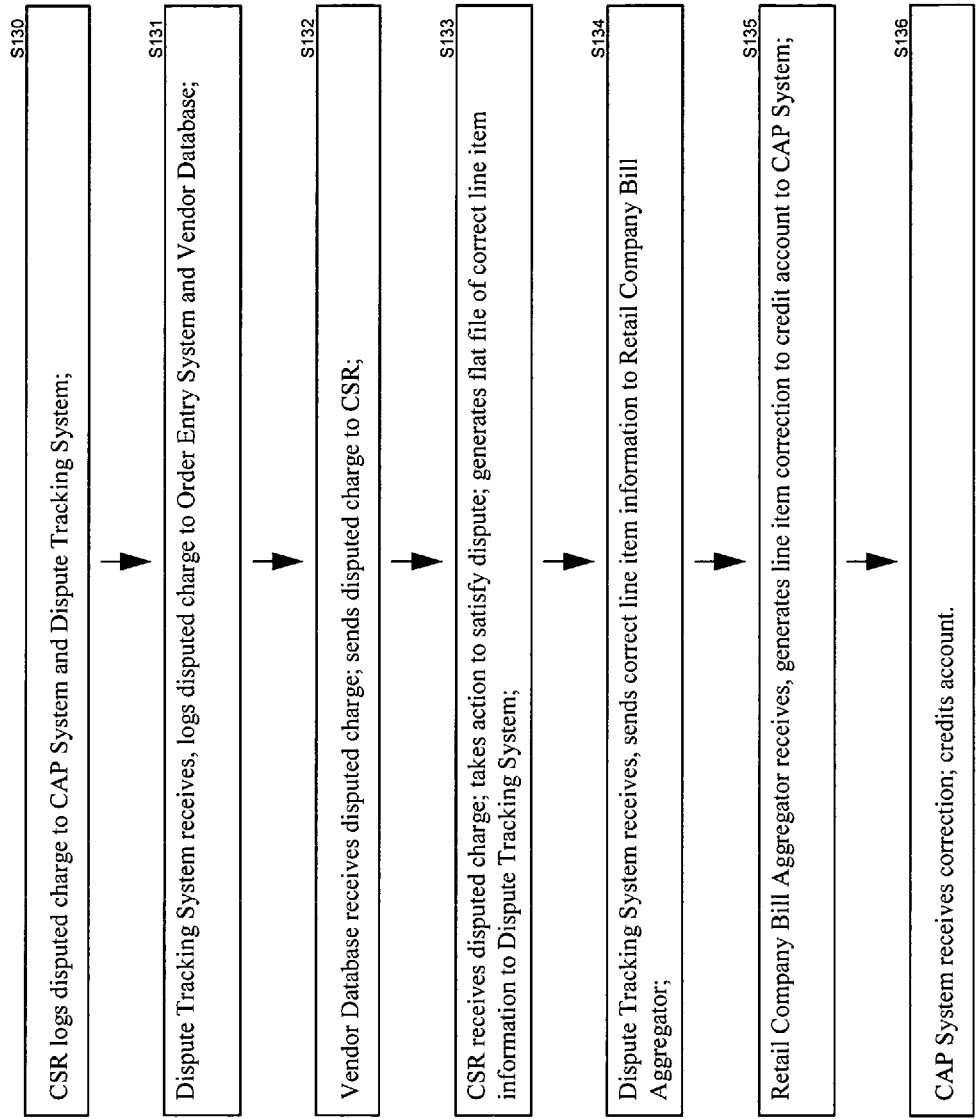
FIG. 18 is a flow chart which provides further detail regarding the process of the customer inquiring about a bill adjustment relating to a non-energy retail company product, where the dispute is found to be correct, for an embodiment of the present invention.

FIG. 18 is a flow chart which provides further detail regarding the process of the customer 110 inquiring about a bill adjustment relating to a non-energy retail company product, where the CSR 101 is unable to resolve the dispute and the dispute is found to be correct, for an embodiment of the present invention. Referring to FIG. 18, at S130, the CSR 101 logs the disputed charge to the CAP system 142 and the dispute tracking system 122. At S131, the dispute tracking system 122 receives and logs the disputed charge to the order entry system 116 and the vendor database 199. At S132, the vendor database 199 receives and sends the disputed charge to the CSR 101. At S133, the CSR 101 receives the disputed charge, takes action to satisfy the dispute and generates a flat file of the correct line item information to the dispute tracking system 122. The dispute tracking system 122 receives and sends the correct line item information to the retail company bill aggregator 124 at S134. The retail company bill aggregator 124 receives and generates a line item correction to credit the account to the CAP system 142 at S135. The CAP system 142 receives the correction and credits the account at S136.

Figure 19:
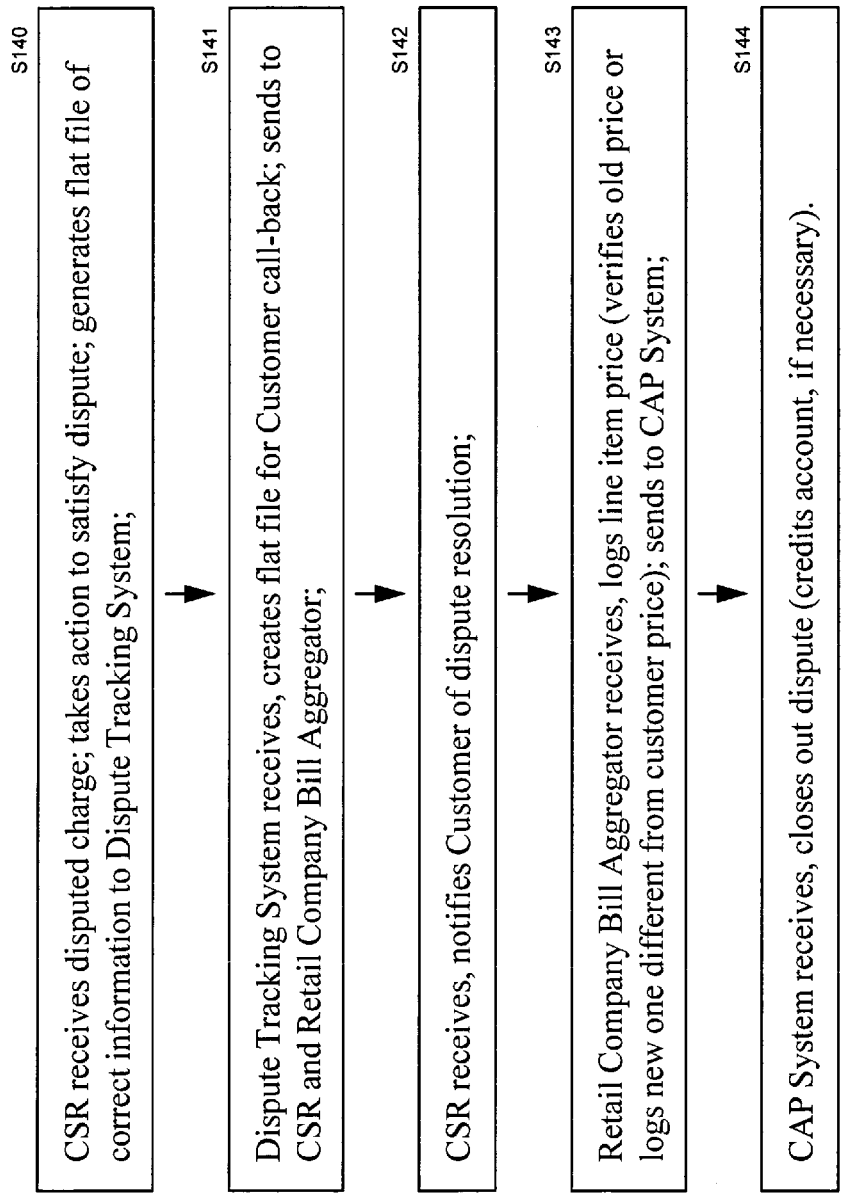
FIG. 19 is a flow chart which provides further detail regarding the process of the customer inquiring about a bill adjustment relating to a non-energy retail company product, where the dispute is found to be incorrect, for an embodiment of the present invention.

FIG. 19 is a flow chart which provides further detail regarding the process of the customer 110 inquiring about a bill adjustment relating to a non-energy retail company product, where the CSR 101 is unable to resolve the dispute and the dispute is found to be incorrect, for an embodiment of the present invention. Referring to FIG. 19, at S140, the CSR 101 receives the disputed charge, takes action to satisfy the dispute, and generates a flat file of the correct line item information to the dispute tracking system 122. At S141, the dispute tracking system 122 receives the flat file and creates and sends a flag file for a customer call-back to the CSR 101 and the retail company bill aggregator 124. At S142, the CSR 101 receives the flag file and notifies the customer 110 of the dispute resolution. At S143, the retail company bill aggregator 124 receives the flag file, logs and sends the line item price (verifies old price or logs new one different from customer price) to the CAP system 142. The CAP system 142 receives and closes out the dispute (e.g., credits the account, if necessary) at S144.

Figure 20:
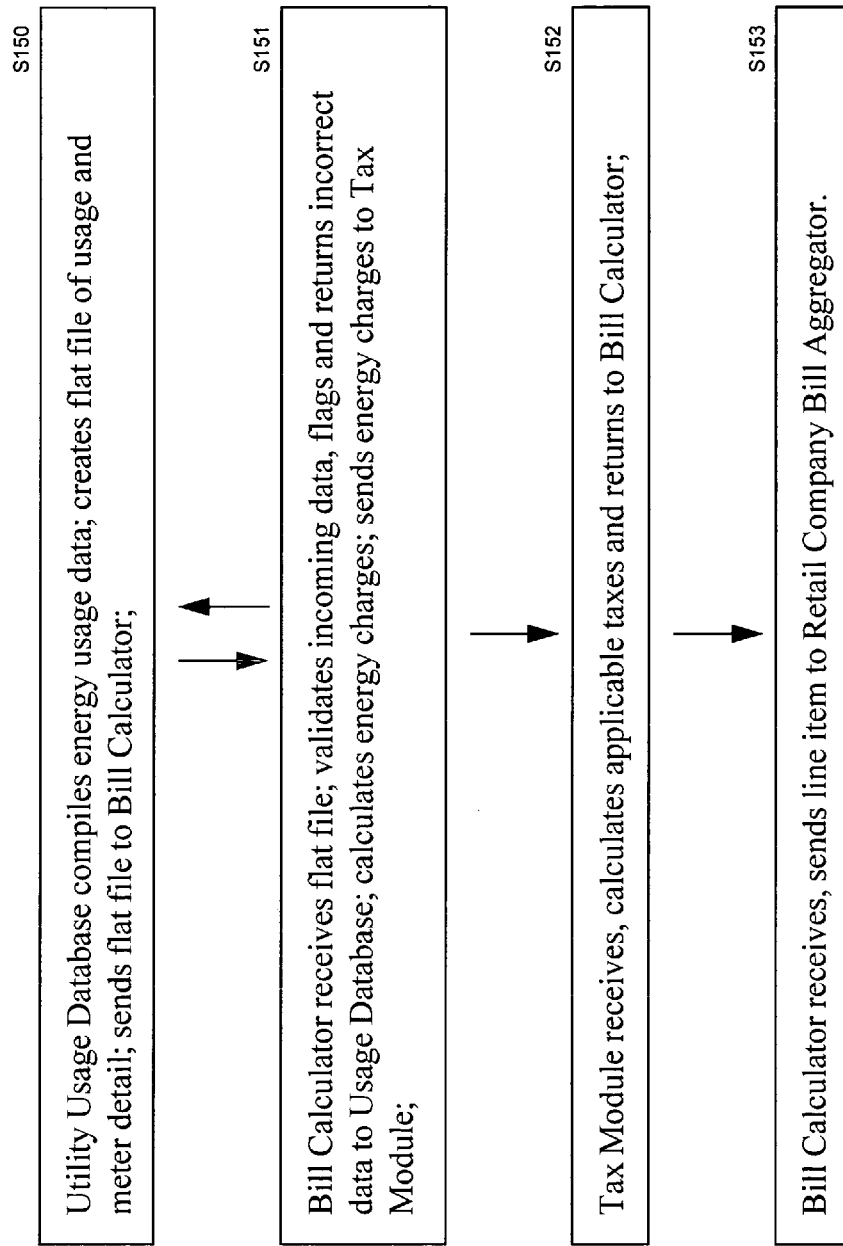
FIG. 20 is a flow chart which provides further detail regarding the process of the energy bill calculator calculating an energy bill for an embodiment of the present invention.

In an embodiment of the present invention, the energy bill calculation system 146 accepts energy usage (kWh/BTU) data and calculates bills based on a usage-based calculation, an average billing calculation with true-up, or a flat-rate bill calculation. The bill calculation system 146 also calculates applicable discounts and applicable state, local and jurisdictional taxes. The bill calculation system 146 further verifies supplier name/ID, and matches the supplier's customer account number to the financial institution's customer number, for example, matching the supplier's customer number with the customer 110 via a table and flagging "lost" records for intervention. In addition, the bill calculation system 146 determines format rules, for example, by jurisdiction, and verifies cycle-time ID and account, location and/or site. FIG. 20 is a flow chart which provides further detail regarding the process of bill calculator 146 calculating a bill for an embodiment of the present invention. The usage database 196 compiles energy usage data and creates and sends a flat file of usage and meter detail to the bill calculator 146 at S150. At S151, the bill calculator 146 receives the flat file, validates the incoming data and flags and returns incorrect data to usage database 196, and calculates and sends energy charges to the tax module 178. The tax module 178 receives the charges and calculates and returns the applicable taxes to the bill calculator 146 at S152. The bill calculator 146 receives the taxes and sends a line item to the retail company bill aggregator 124 at S153.

In an embodiment of the present invention, billing capabilities of the system include bundling, bill aggregation, customer statementing, and payment processing. The process of bundling involves calculating the bill, including charges for other products in the bundle, and forwarding the calculated bundle bills to bill aggregation system 142. The bill is calculated by receiving and validating usage data from the retailer, rejecting and returning data that does not conform to specifications, calculating charges and taxes based on the energy retailer's pricing, and creating an estimated bill when usage is not available. Charges are included for other products in the bundle by receiving and validating charges for other products in the bundle, such as home security, and adding charges for other products to the calculated bill. The calculated energy bundle bills are forwarded to the bill aggregation system 142 by formatting data for transmission and sending an electronic transmission of the data to the bill aggregation system 142.

In an embodiment of the present invention, the account management system maintains the balance, calculates charges and fees, calculates past due amounts and maintains the payment hierarchy. Maintaining the balance includes maintaining the previous balance, summing current charges, applying payments, and calculating a new balance. Calculating the charges and fees includes determining applicable business rules and calculating usage fees, late fees, and finance charges. Calculating past due amounts involves maintaining the new balance, applying payments, and calculating past due amounts. Maintaining the payment hierarchy includes determining the business rules and allocating payments to products. Risk management includes developing credit policies, such as determining risk score criteria, updating portfolio scores, and obtaining credit bureau data, as well as managing fraud. Collections involves determining past due status, processing charge-off/bankruptcy, posting charge-off recovery and agency management, and managing collection agencies.

In an embodiment of the present invention, the financial institution's system 114 receives priced charges. Retail company pricing is in accordance with the sum of the component charges submitted by supply chain vendors 140. The financial institution's system 114 insures that a customer's statement reflects the prices quoted to the customer 110. The system 114 matches the charges received from the supply chain vendors 140 with the retail company's pricing (stored in order entry), and the supply chain vendor's pricing and the retail company's pricing are always synchronized. The supply chain vendors 140 send a breakout of charges to allow the financial institution's system 114 to validate the charge independent of taxes and shipping charges. Charges are 'posted' against the customer's account quickly (i.e., the system does not hold the retail company's charges until the end of a billing cycle before sending the charges to the CAP system 142 for posting in the TSYS system 156). Types of discounts applied are non-volume based, non-entangled discounts (i.e., discounts based on the volume of multiple components). The retail company charge is calculated when the charge arrives and the receivable passed to the CAP system 142. The system 114 does not wait for multiple charges to arrive before calculating the final invoice and passing the invoice on to the CAP system 142.

In an embodiment of the present invention, the bill calculation module 146 receives usage data, such as kWh for electricity or MMCF for gas, and other priced charges from the supply chain vendors 140. In addition to usage data and other related charges, other information is received from the vendor 140 and placed on the final bill to provide additional information about the usage, including, for example, meter number, last reading, current reading, start and end dates. The bill calculation module 146 converts the usage data into a rated bill, including any tax due on the sale. The retail company 234 also provides the financial institution 100 the required information to properly calculate the tax due on each sale. In the process for calculating the bill, initially, the incoming data is validated. Validating the data includes, receiving line items via a flat file from each supply chain vendor 140 or its meter reading vendor, validating the formatting of each line item, and returning any line items that do not match the mutually agreed upon format.

In an embodiment of the present invention, each line item includes the retail company's order number, the supply chain vendor's order number (in order to acquire the customer number), the supply chain vendor's part number for the type of service, and the billing code indicating the type of information or action to be taken. The billing codes include an on time fee (initial, termination, penalty, rebate, or miscellaneous), a recurring fee (daily, weekly, bimonthly, monthly, quarterly, semi-annual, or annual), and a usage charge-re-read. Each line item also includes the value (kWh, MMCF, or dollars depending on billing code), any descriptive text relating to the line item, such as meter number, begin and end dates, and begin and end meter readings.

In an embodiment of the present invention, a 'sanity check' of the information is performed, and any items that are outside of mutually agreed upon bounds are returned. The supply chain vendor's order number is validated, the type of service (gas or electric) of each item is validated (each line item matched to a financial institution number and component, respectively), and line items where the order cannot be located are returned. Line items are validated against the customer's order to insure that the customer 110 ordered the service, and line items for which no order by the customer 110 matches the line item are returned. For incidental charges (i.e., non-usage-based charges such as connection fees, disconnect fees, etc.) it is verified that the amount charged matches the amount specified in the component configuration database 132, and any charges that do not match the price listed in the component configuration database 132 (since this is the price quoted to the customer) are returned.

In an embodiment of the present invention, calculation of the charges for each usage line item, includes determining the total charges based on the usage data sent, the type of rate (e.g., flat rate, tiered, terraced, average) specified in the component configuration database 132, and the rate from the customer's order. Also, the applicable taxing jurisdictions are determined based on the customer, order, type, and information provided by the retail company 234, and for each taxing jurisdiction, all applicable taxes are calculated. A line item detail is created for presentation on the bill. The line item detail includes usage and any other data provided by the vendor 140, such as meter readings and meter numbers, the rate and type of rate used to calculate the charges, and the total price, with line items for each type, such as gas and electric. All calculated taxes are also listed, as well as any incidental charges, such as connection fees and disconnection fees. Finally, the total price is presented.

In an embodiment of the present invention, the bill aggregation system 142 includes the bill charges and telecommunication charges, calculates a credit card bill and an aggregated bill and performs accounting functions. Energy bill charges are included by receiving and validating the bill and rejecting and returning data that does not conform to specifications. Telecommunication charges are included by receiving and validating telecom charges from the telecommunication vendor and rejecting and returning data that does not conform to specifications. Calculating the credit card bill involves assembling charges, calculating fees and finance charges, and calculating payments due. Calculating the aggregated bill includes assembling the energy bill, telecommunication bill, and credit card charges, calculating bundled discounts, rebates, and rewards, applying discounts to the aggregated bill, and calculating current charges due for the aggregated bill. Accounting includes, for example, identifying transaction types, creating journal entries, and performing audits.

In an embodiment of the present invention, the retail company's bill aggregator system 124 calculates all retail company charges, discounts, rebates, and affinity points for each customer before feeding the data into the financial institution's billing system. The retail company's bill aggregator 124 receives the line items from the supply chain vendor 140, validates this information, and locates the appropriate customer 110 and order. The line items are received via a flat file from each supply chain vendor 140. Each line item includes the retail company's order number, the supply chain vendor's order number, the supply chain vendor's part number for the type of service, and the billing code indicating the type of information or action to be taken. The billing codes include one time fee (initiation, termination, penalty, rebate, and miscellaneous) and recurring fee (daily, weekly, bimonthly, monthly, quarterly, semi-annually, annually, and tax). Each line item also includes the dollar amount and any descriptive text relating to the line item. The retail company's bill aggregator 124 also validates the formatting of each line item and returns any line items that do not match the mutually agreed upon format. A component that has multiple charges (i.e., tax, shipping) creates multiple line items, one for each charge.

Figure 21:
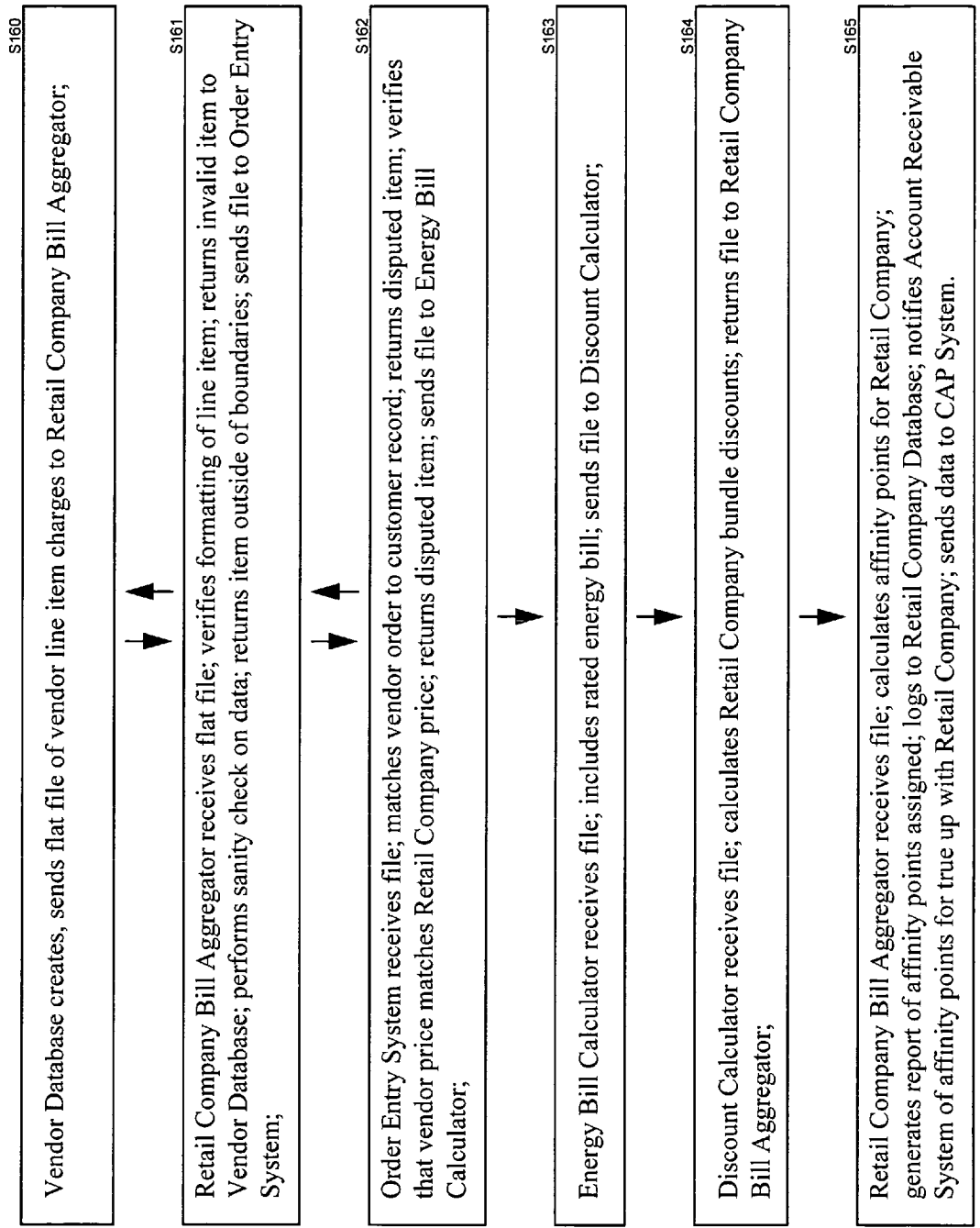
FIG. 21 is a flow chart which provides further detail regarding the process of the retail company bill aggregator calculating all retail company charges for an embodiment of the present invention.

FIG. 21 is a flow chart which provides further detail regarding the process of the retail company bill aggregator 124 calculating all retail company charges for an embodiment of the present invention. Referring to FIG. 21, the vendor database 199 creates and sends a flat file of vendor line item charges to the retail company bill aggregator 124 at S160. At S161, the retail company bill aggregator 124 receives the flat file, verifies the formatting of line item, returns invalid items to the vendor database 199, performs a "sanity check" on the data and returns items outside of boundaries, and sends the file to the order entry system 116. At S162, the order entry system 116 receives the file, matches vendor orders to the customer record 184 and returns disputed items, verifies that the vendor prices matches the retail company prices and returns disputed item, and sends the file to the energy bill calculator 146. The energy bill calculator 146 receives the file, includes the rated energy bill, and sends the file to the discount calculator 148 at S163. The discount calculator 148 receives the file, calculates retail company bundle discounts, and returns the file to the retail company bill aggregator 124 at S164. At S165, the retail company bill aggregator 124 receives the file, calculates affinity points for the retail company 234 and generates and logs a report of affinity points assigned to the retail company database 201. The retail company bill aggregator 124 also notifies the account receivable system of affinity points for true up with the retail company 234 and sends the data to the CAP system 142.

In an embodiment of the present invention, the retail company's bill aggregator 142 performs a range value validation on the information and returns any items that are outside of mutually agreed upon bounds. The corresponding order record is located using the supply chain vendor's order number and the order table. The supply chain vendor's order number, which was stored with the order record 136 in the order entry system 116 when the vendor 140 acknowledged the order, relates to the customer record 126 and the bundle 128, products 130, and components 132 purchased. The supply chain vendor's component number is validated to match one of the components purchased by the customer 110 in the particular order. If they do not match, the record is placed in dispute for later review. The price received from the supply chain vendor 140 is validated (i.e., the line with the billing code corresponds to the item being purchased) to match the price within the retail company's component database. Non-energy charges received must match the retail company's component price. If not, the line item is rejected and returned. All of the retail company's pricing except bundle discounts must be synchronized with the supply chain vendor's price for the component. Non-energy rated bills received include taxation calculations from the supply chain vendor 140.

In an embodiment of the present invention, discounts enable the retail company 234 to reward its customers for purchasing bundles of multiple products and components. Discounts are only applied to bundles. Discounts are a flat percentage of the total price. Tiered, tapered or other discounts that vary with the total purchase amount of multiple components are not available in the base offering due to the time delays incurred in processing charges with volume-based discounts. The information relating to bundles includes, for example, discount name, customer eligibility, bundle eligibility, discount rate applicable, and effective date and expiration date. The financial institution's system 114 maintains a discount schedule by product and/or offering (flat, tiered, or tapered) and by type, such as usage-based (e.g., minutes), non-usage-based (e.g., dollars), or both. The system 114 also establishes frequency of discount application and eligibility, for example, according to customer-based rules or product and/or offering-based rules, and maintains discount charges.

In an embodiment of the present invention, for each customer order of a bundle, the financial institution's system 114 calculates the retail company's discount that applies to the bundled offering. The type of discount available for bundles is a flat percentage discount applied to non-credit card and non-telephony charges. The system 114 also calculates and applies any affinity points offered by the retail company 234, based on the customer's total retail company bill for a particular billing cycle. The financial institution's system 114 "trues up" with the retail company's system for the cost of affinity points at a later date/periodically. The retail company affinity points are assigned based on overall dollar value of retail company sales of non-telephony, non-credit card charges. The financial institution 100 legally purchases the receivable. Only a flat percentage discount is allowed to insure that each line item can be processed independently and passed to the financial institution's CAP system 142 for posting after it is received. The retail company 234 does not hold charges until the end of a billing cycle. To maintain credit and float problems, charges are processed and posted to the financial institution's general ledger 156 as quickly as possible.

In an embodiment of the present invention, the statement generation system 164 receives aggregated bill data, formats a statement, and renders the statement. The aggregated bill data is received, validated, and stored by the financial institution's system 114. The statement is formatted by identifying the customer format requirements for the individual customer 110 and formatting a universal statement. Rendering the statement involves identifying customer delivery requirements for the individual customer 110 and delivering the universal statement, for example, by print; mail, fax, or the Internet. Once the usage bill is calculated and taxes applied, ownership of the receivable is purchased by the financial institution. The financial institution 100 establishes a consumer agreement to define the credit relationship, payment requirements and rights and obligations. The receivable is purchased at a discount rate, including anticipated net bad debt, financing and servicing costs. The utility compensates the financial institution 100 for "exceptional" bad debt losses and adjustments to cost of funding changes. Bill adjustments are returned to the retailer. Charges are posted to the consumer's combined billing account monthly, or in a manner similar to calling card charges. Each month's charges are due in full. Unpaid balances are subject to the terms and conditions defined by the financial institution 100 in the consumer agreement. Financing options may be added.

Figure 22:
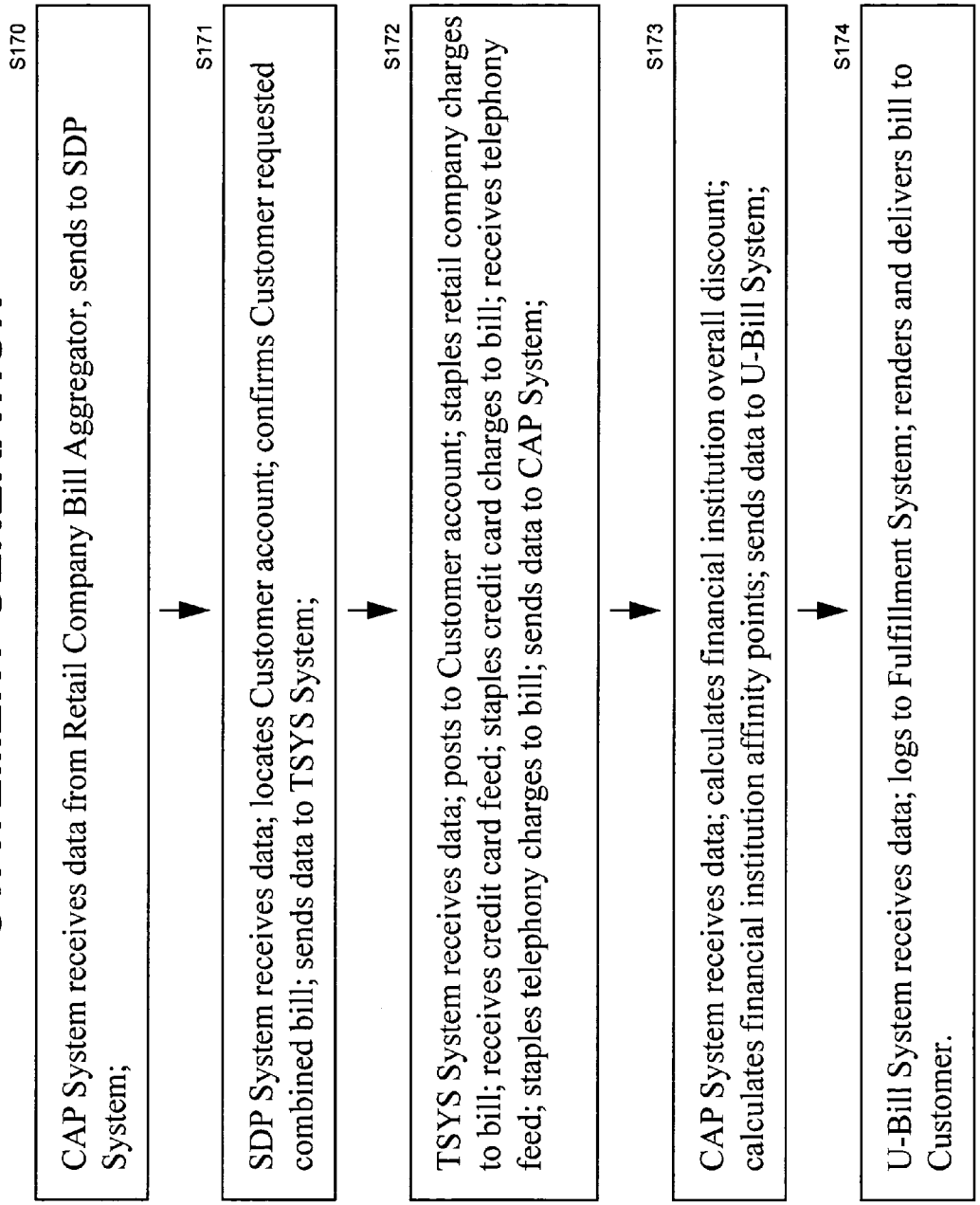
FIG. 22 is a flow chart which provides further detail regarding the process of the statement generation system generating a combined statement for an embodiment of the present invention.

FIG. 22 is a flow chart which provides further detail regarding the process of generating a combined statement for an embodiment of the present invention. The CAP system 142 receives the data from the retail company bill aggregator 124 and sends the data to the SDP system 162 at S170. The SDP system 162 receives the data, locates the customer account and confirms that the customer 110 requested a combined bill, and sends the data to the TSYS system 156 at S171. At S172, the TSYS system 156 receives and posts the data to the customer account and staples the retail company charges to the bill, receives the credit card feed 154 and staples the credit card charges to the bill, receives the telephony feed 152 and staples the telephony charges to the bill, and sends the data to the CAP system 142. The CAP system 142 receives the data, calculates the financial institution overall discounts and affinity points, and sends the data to the U-bill system 164 at S173. At S174, the U-bill system 164 receives and logs the data to the fulfillment system 166 and renders and delivers a bill to the customer 110.

In an embodiment of the present invention, the statement generation system 164 takes the charges from the retail company aggregator 124 and the credit card 154 and the telephony 152 direct feeds, places them on a single bill, and applies any overall financial institution discounts. The system 164 renders and delivers a bill to the customer 110 in the customer's preferred format. The retail company charges are combined with credit card and telephony charges. In a combined bill for the customer 110 the retail company charges are combined with the customer's credit card charges and any direct telephony charges for the billing cycle. Any financial institution overall discounts are applied. Any overall financial institution discounts based on the retail company plus the financial institution plus telephony purchases by the individual customer are applied. A discount is given to the customer 110 for receiving a combined bill. Financial institution affinity points are calculated and applied. The applicable affinity points offered by the financial institution 100 or telephony for the customer based on the overall retail company plus financial institution plus telephony purchases are calculated. The bill or statement is rendered in the format desired by the customer 110 and delivered to the customer 110 by paper invoice, electronic (Web based) invoice, or electronic (CD-ROM or floppy) invoice. FIGS. 24–29 show a sample of the combined statement generated for the customer 110 by the statement generation system 164 for an embodiment of the present invention. FIG. 30 depicts the annual expenditures by industry.

In an embodiment of the present invention, the payment processing system receives payments, posts payments to account, and processes. Payments are received, for example, by check, autopay, or the Internet. Payments are validated, and exceptions are processed. Payments are posted to accounts by applying payment amounts to accounts and decreasing the balance in accordance to the amount paid. Processing address changes includes receiving address changes and applying address changes to the customer database 184. The receivable management system involves financing; account management, risk management, and collections. Financing includes, for example, identifying client charges, applying pricing rules, forwarding payment to clients, and performing audits, as well as funding.

In an embodiment of the present invention, marketing services of the system include marketing development, marketing databasing, marketing analysis, program management, new account acquisition, portfolio communication, and client services. Marketing development involves analyzing market/industry, such as reviewing secondary research material, perform analysis, and publishing reports; developing products, such as defining product concepts, conducting market research, and defining product features and benefits; defining test plans, such as defining test objectives, designing a test matrix, calculating test size, estimating test budget, and publishing a test schedule; and planning marketing campaigns, such as identifying market segments, developing a marketing strategy, designing a communications plan, developing a campaign budget, and publishing a campaign schedule. Marketing databasing includes maintaining accounts on the database, such as establishing and updating account data, defining account relationship to available products, storing product usage data, and storing customer and account data; and providing access to customer information, such as providing access to customer and account data, providing access to product usage data, and publishing customer information reports and data.

In an embodiment of the present invention, marketing analysis includes performing behavioral analysis, such as performing modeling to identify customer behavior tendencies and publishing reports; and performing financial analysis, such as performing analysis for marketing results reporting and publishing reports. Program management involves managing test plans, such as managing the implementation of market tests, publishing status reports and identifying and resolving implementation issues; implementing market plans, such as managing the implementation of market tests, publishing status reports, and identifying and resolving implementation issues; and publishing marketing reports, such as providing system infrastructure to capture performance data and publishing performance reports.

In an embodiment of the present invention, new account acquisition includes managing acquisition plans, such as managing the implementation of acquisition plans, publishing status reports, and identifying and resolving implementation issues; providing new account services, such as receiving requests for new account products/services, identifying customer accounts, qualifying accounts for products/services requested, and providing requests by forwarding orders to providers or by going on-line to providers' systems. New account acquisition also includes updating marketing databases, such as establishing account data, defining account relationships to available products, and storing customer and account data; and publishing results reports, such as providing system infrastructure to capture performance data and publishing performance results.

In an embodiment of the present invention, portfolio communication includes providing routine communication, such as planning annual bill inserts and statement messages and managing communications plan; and distributing credit terms and conditions, such as defining customer terms and conditions and distributing to customers annually. Client services include managing client relationships with retailers and developing business requirements.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention. Accordingly, the invention is only limited by the following claims.

What is claimed is:

1. A method of combined billing for at least one customer on a plurality of customer accounts, comprising:
   receiving account data for the plurality of customer accounts electronically from time-to-time by a service provider from each of a plurality of billers;
   acquiring ownership of receivables represented by the account data by the service provider under contractual arrangements with the plurality of billers upon receipt of the account data;
   automatically calculating account charges for the plurality of customer accounts from the account data;
   aggregating the account charges for at least one customer on the plurality of customer accounts;
   automatically formatting a combined bill for the customer from the aggregated account charges; and
   automatically rendering the combined bill to the customer;
   wherein at least one of the plurality of accounts is a recurring bill account, wherein the customer continues to purchase products or services from at least one of the billers after the service provider acquires ownership of the receivables associated with the account data received, and wherein the service provider acquires ownership of receivables associated with the subsequently purchased products or services after receiving account data for the customer account from the at least one biller.

2. The method of claim 1, wherein the account charge is calculated by a computer application.

3. The method of claim 2, wherein the computer application comprises a financial institution application.

4. The method of claim 3, wherein the financial institution comprises a bank.

5. The method of claim 1, wherein one of the plurality of customer accounts comprises at least one selected from the group of a recurring bill account, a retail account, a communications account, and a financial account.

6. The method of claim 5, wherein the recurring bill account comprises at least one selected from the group of an electric account, a gas account, a cable account, a home security account, and a water account.

7. The method of claim 5, wherein the retail account comprises at least a credit card account.

8. The method of claim 5, wherein the communications account comprises at least one selected from the group of a long distance account, a local account, a wireless account, and an Internet access account.

9. The method of claim 5, wherein the financial account comprises at least one selected from the group of an insurance account, an investments account, an auto account, a bank statement account, an installment account, and a mortgage account.

10. The method of claim 5, wherein the cable services include pay television services.

11. The method of claim 1, further comprising automatically formatting the account charges.

12. The method of claim 11, further comprising transmitting the formatted account charges to a bill aggregator.

13. The method of claim 1, wherein the account data comprises usage data.

14. The method of claim 13, further comprising automatically calculating a usage charge from the usage data.

15. The method of claim 14, wherein the usage charge is calculated according to a predefined usage pricing schedule.

16. The method of claim 15, further comprising automatically calculating a tax associated with the usage charge.

17. The method of claim 16, wherein the tax is calculated according to a predefined usage charge tax schedule.

18. The method of claim 17, further comprising automatically calculating the account charge from the usage charge and the associated tax.

19. The method of claim 1, further comprising automatically validating the account data.

20. The method of claim 19, wherein validating comprises automatically comparing the account data with predefined account data parameters.

21. The method of claim 20, wherein validating further comprises automatically rejecting account data that falls outside the predefined account data parameters.

22. The method of claim 1, wherein aggregating further comprises automatically validating the account charges.

23. The method of claim 22, wherein validating further comprises automatically comparing the account charges with predefined account parameters.

24. The method of claim 23, wherein validating further comprises automatically rejecting account charges that fall outside the predefined account parameters.

25. The method of claim 1, wherein aggregating comprises automatically assembling the account charges.

26. The method of claim 25, wherein at least one of the account charges relates to a credit card account, and wherein assembling comprises automatically calculating at least one selected from the group of a fee and a finance charge associated with the credit card account charge.

27. The method of claim 26, wherein assembling further comprises automatically calculating a credit card account payment due amount from the credit card account charge and at least one selected from the group of the fee and the finance charge.

28. The method of claim 25, wherein assembling further comprises automatically calculating a discount associated with the assembled account charges.

29. The method of claim 28, wherein the discount is calculated according to a predefined discount schedule.

30. The method of claim 25, wherein assembling further comprises automatically calculating a rebate amount associated with the assembled account charges.

31. The method of claim 25, wherein assembling further comprises automatically calculating a reward amount associated with the assembled account charges.

32. The method of claim 1, further comprising automatically validating the aggregated account charges.

33. The method of claim 1, wherein the formatted bill comprises an electronic mail message.

34. The method of claim 1, wherein rendering comprises automatically storing the formatted bill for the customer in a storage location.

35. The method of claim 34, wherein the storage location comprises a server.

36. The method of claim 34, further comprising transmitting the formatted bill from the storage location to a terminal.

37. The method of claim 36, further comprising displaying the formatted bill at the terminal by the customer.

38. The method of claim 1, further comprising transmitting an inquiry for the customer regarding at least one of the customer accounts.

39. The method of claim 1, further comprising transmitting a request for the customer for an information change regarding at least one of the customer accounts.

40. The method of claim 1, further comprising transmitting an order for the customer for at least one of the customer accounts.

41. The method of claim 40, further comprising processing an order for the customer for the customer account.

42. The method of claim 1, further comprising transmitting a request for the customer for cancellation of at least one of the customer accounts.

43. The method of claim 1, further comprising transmitting a request for the customer for an adjustment of the combined bill regarding at least one of the customer accounts.

44. The method of claim 43, wherein the customer account comprises a recurring bill account.

45. The method of claim 1, further comprising the customer paying the bill.

46. A system for combined billing for at least one customer on a plurality of customer accounts, comprising:
   means for receiving account data for the plurality of customer accounts electronically from time-to-time by a service provider from each of a plurality of billers;
   means for acquiring ownership of receivables represented by the account data by the service provider under contractual arrangements with the plurality of billers upon receipt of the account data;
   means for automatically calculating account charges for the plurality of customer accounts from the account data;
   means for aggregating the account charges for a least one customer on the plurality of customer accounts;
   means coupled to the aggregating means for automatically formatting a combined bill for the customer from the aggregated account charges; and
   means associated with the formatting means for rendering the combined bill to the customer;
   wherein at least one of the plurality of accounts is a recurring bill account, wherein the customer continues to purchase products or services from at least one of the billers after the service provider acquires ownership of the receivables associated with the account data received, and wherein the service provider acquires ownership of receivables associated with the subsequently purchased products or services after receiving account data for the customer account from the at least one biller.

47. The system of claim 46, wherein the aggregating means comprises a server.

48. The system of claim 46, wherein the formatting means comprises a server.

49. The system of claim 46, wherein the rendering means comprises a server.

50. A method of combined billing for at least one customer on a plurality of customer accounts by a service provider, comprising:
   entering contractual arrangements with a plurality of billers to have their account data for the plurality of customer accounts delivered to a service provider electronically;
   receiving the account data electronically from time-to-time during a billing cycle by the service provider from each of the billers, each reading out transactions one at a time to an accounts receivable computer system of the service provider;
   storing the account data at a customer level in a computer database of the service provider;

acquiring ownership by the service provider of receivables represented by the account data under the contractual arrangement when the account data is received by the service provider;

remitting payment for the receivables to the billers by the service provider under the contractual arrangement within a pre-determined period after receiving the account data;

automatically calculating account charges for the plurality of customer accounts from the account data;

aggregating account charges for at least one customer on a plurality of customer accounts;

automatically generating a combined bill for the customer from the aggregated account charges at a pre-determined cycle time for the customer's account; and automatically rendering the combined bill to the customer as a debt of the customer to the service provider as owner of the receivable represented by the combined bill;

wherein at least one of the plurality of accounts is a recurring bill account, wherein the customer continues to purchase products or services from at least one of the billers after the service provider acquires ownership of the receivables associated with the account data received, and wherein the service provider acquires ownership of receivables associated with the subsequently purchased products or services after receiving account data for the customer account from the at least one biller.

51. A system of combined billing for at least one customer on a plurality of customer accounts by a service provider, comprising:

means for entering contractual arrangements with a plurality of billers to have their account data for the plurality of customer accounts delivered to a service provider electronically;

means for receiving the account data electronically from time-to-time during a billing cycle by the service provider from each of the billers, each reading out transactions one at a time to an accounts receivable computer system of the service provider;

means for storing the account data at a customer level in a computer database of the service provider;

means for acquiring ownership by the service provider of receivables represented by the account data under the contractual arrangement when the account data is received by the service provider;

means for remitting payment for the receivables to the billers by the service provider within a pre-determined period after receiving the account data;

means for automatically calculating account charges for the plurality of customer accounts from the account data;

means for aggregating account charges for at least one customer on a plurality of customer accounts;

means for automatically generating a combined bill for the customer at a pre-determined cycle time for the customer's account;

means for automatically formatting a combined bill for the customer from the aggregated account charges; and means for automatically rendering the combined bill to the customer as a debt to the service provider as owner of the receivable represented by the combined bill;

wherein at least one of the plurality of accounts is a recurring bill account, wherein the customer continues to purchase products or services from at least one of the billers after the service provider acquires ownership of the receivables associated with the account data received, and wherein the service provider acquires ownership of receivables associated with the subsequently purchased products or services after receiving account data for the customer account from the at least one biller.

52. A method of combined billing for at least one customer on a plurality of customer accounts by a financial institution, comprising:

entering contractual arrangements with a plurality of billers to have their account data for the plurality of customer accounts delivered to a financial institution electronically;

periodically receiving the account data electronically during a billing cycle by the financial institution from each of the billers, each reading out transactions one at a time to an accounts receivable computer system of the financial institution;

storing the account data at a customer level in a computer database of the financial institution;

acquiring ownership by the financial institution of receivables represented by the account data under the contractual arrangement when the account data is periodically received by the financial institution;

remitting payment for the receivables to the billers by the financial institution under the contractual arrangement within a pre-determined period after receiving the account data;

automatically calculating account charges for the plurality of customer accounts from the account data;

aggregating account charges for at least one customer on a plurality of customer accounts;

automatically generating a combined bill for the customer from the aggregated account charges at a pre-determined cycle time for the customer's account; and automatically rendering the combined bill to the customer as a debt of the customer to the service provider as owner of the receivable represented by the combined bill;

wherein at least one of the plurality of accounts is a recurring bill account, wherein the customer continues to purchase products or services from the at least one of the billers after the service provider acquires ownership of the receivables associated with the account data received, and wherein the service provider acquires ownership of receivables associated with the subsequently purchased products or services after receiving account data for the customer account from the at least one biller.

53. A system of combined billing for at least one customer on a plurality of customer accounts by a service provider, comprising:

means for entering contractual arrangements with a plurality of billers to have their account data for the plurality of customer accounts delivered to a service provider electronically;

means for periodically receiving the account data electronically from time-to-time during a billing cycle by the service provider from each of the billers, each reading out transactions one at a time to an accounts receivable computer system of the service provider;

means for storing the account data at a customer level in a computer database of the service provider;

means for acquiring ownership by the service provider of receivables represented by the account data under the contractual arrangement when the account data is periodically received by the service provider;

means for remitting payment for the receivables to the billers by the service provider within a pre-determined period after receiving the account data;

means for automatically calculating account charges for the plurality of customer accounts from the account data;

means for aggregating account charges for at least one customer on a plurality of customer accounts;

means for automatically generating a combined bill for the customer at a pre-determined cycle time for the customer's account;

means for automatically formatting a combined bill for the customer from the aggregated account charges; and means for automatically rendering the combined bill to the customer as a debt to the service provider as owner of the receivable represented by the combined bill;

wherein at least one of the plurality of accounts is a recurring bill account, wherein the customer continues to purchase goods or services from the at least one of the billers after the service provider acquires ownership of the receivables associated with the account data received, and wherein the service provider acquires ownership of receivables associated with the subsequently purchased products or services after receiving account data for the customer account from the at least one biller.

* * * * *

UNITED STATES PATENT AND TRADEMARK OFFICE
CERTIFICATE OF CORRECTION

| | |
|---|---|
| PATENT NO. | : 7,236,950 B2 |
| APPLICATION NO. | : 09/181658 |
| DATED | : June 26, 2007 |
| INVENTOR(S) | : Patrick Savage, Jitendra Chhikara and Frederick W. Platz, Jr. |

It is certified that error appears in the above-identified patent and that said Letters Patent is hereby corrected as shown below:

IN THE REFERENCES CITED (56) - OTHER PUBLICATIONS -

On Page 2, Column 2, Line 1 of the Fifth Reference, please change "Article from The American Banker, dated Aug. 6, 1985, entitled" to -- Article from The American Banker, dated Aug. 6, 1986, entitled --

On Page 2, Column 2, Line 2 of the Fifteenth Reference, please change "Yes, Virignia, There Will be a Postal Service in the $21^{st}$ Century." to -- "Yes, Virginia, There Will be a Postal Service in the $21^{st}$ Century." --

On Page 2, Column 2, Line 2 of the Eighteenth Reference, please change "Technology Won'T Stop the Postal Service in $21^{st}$ Century."" to -- Technology Won't Stop the Postal Service, in $21^{st}$ Century." --

IN THE DRAWINGS:

Please replace Fig. 1 with the following figure (some of the reference numbers were cut off when figure was included in the issued patent):

UNITED STATES PATENT AND TRADEMARK OFFICE
CERTIFICATE OF CORRECTION

PATENT NO.         : 7,236,950 B2
APPLICATION NO. : 09/181658
DATED              : June 26, 2007
INVENTOR(S)        : Patrick Savage, Jitendra Chhikara and Frederick W. Platz, Jr.

It is certified that error appears in the above-identified patent and that said Letters Patent is hereby corrected as shown below:

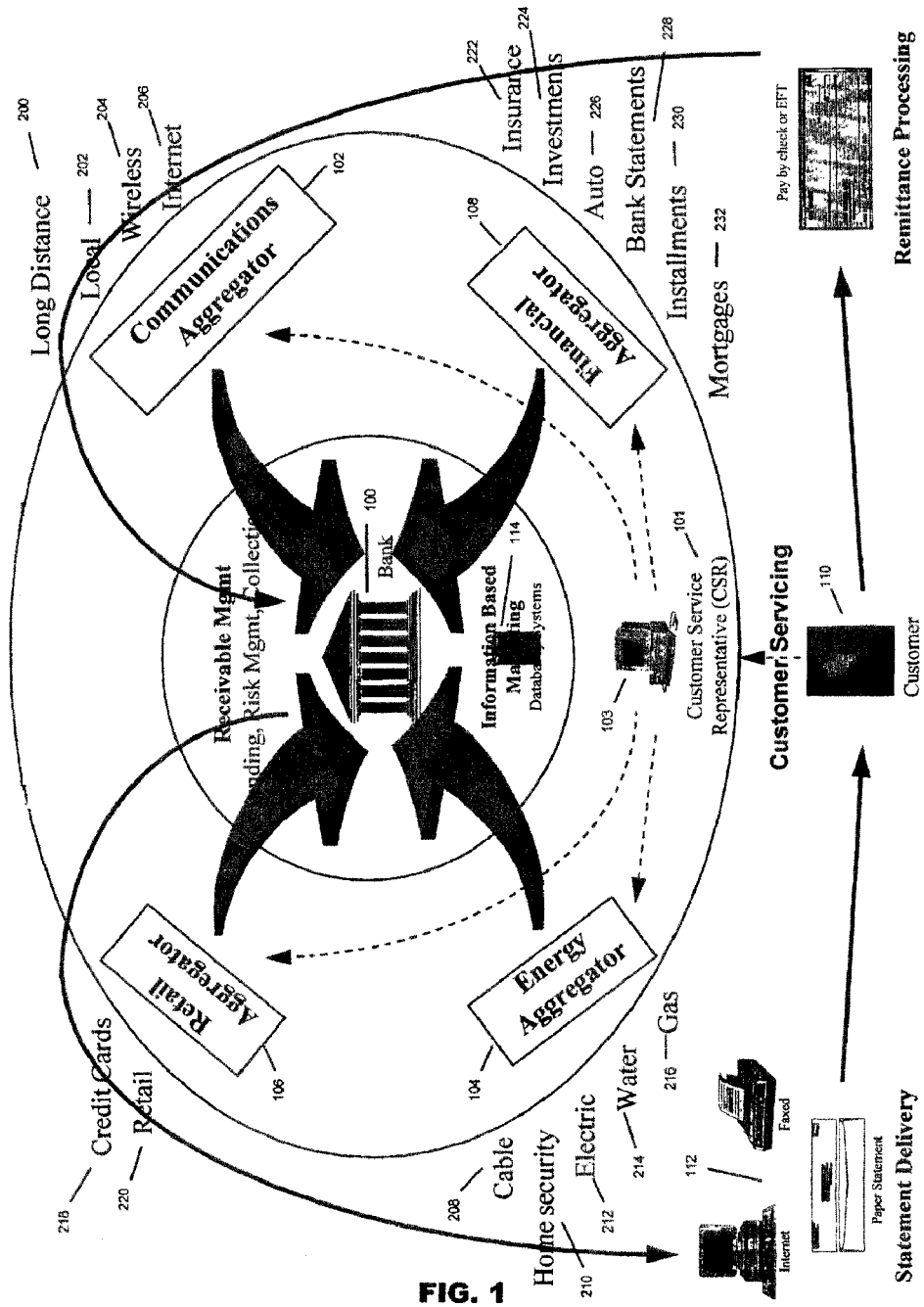

FIG. 1

UNITED STATES PATENT AND TRADEMARK OFFICE
CERTIFICATE OF CORRECTION

| | |
|---|---|
| PATENT NO. | : 7,236,950 B2 |
| APPLICATION NO. | : 09/181658 |
| DATED | : June 26, 2007 |
| INVENTOR(S) | : Patrick Savage, Jitendra Chhikara and Frederick W. Platz, Jr. |

It is certified that error appears in the above-identified patent and that said Letters Patent is hereby corrected as shown below:

In Column 30, Line 25, please change "bill account, wherein the customer continues to purchase" to -- bill account and wherein the customer continues to purchase --

In Column 30, Line 28, please change "ciated with the account data received, and wherein the" to -- ciated with the account data received. --

In Column 30, please remove/delete Lines 29-32.

In Column 32, Line 40, please change "bill account, wherein the customer continues to purchase" to -- bill account and wherein the customer continues to purchase --

In Column 32, Line 43, please change "ciated with the account data received, and wherein the" to -- ciated with the account data received. --

In Column 32, please remove/delete Lines 44-47.

In Column 33, Line 21, please change "bill account, wherein the customer continues to purchase" to -- bill account and wherein the customer continues to purchase --

In Column 33, please remove/delete Line 24, please change "ciated with the account data received, and wherein the" to -- ciated with the account data received. --

In Column 33, please remove/delete Lines 25-28.

In Column 33, Line 64, please change "bill account, wherein the customer continues to purchase" to -- bill account and wherein the customer continues to purchase --

In Column 33, Line 67, please change "ciated with the account data received, and wherein the" to -- ciated with the account data received. --

In Column 34, please remove/delete Lines 1-4.

In Column 34, Line 39, please change "bill account, wherein the customer continues to purchase" to -- bill account and wherein the customer continues to purchase --

UNITED STATES PATENT AND TRADEMARK OFFICE
CERTIFICATE OF CORRECTION

| | | |
|---|---|---|
| PATENT NO. | : 7,236,950 B2 | Page 4 of 4 |
| APPLICATION NO. | : 09/181658 | |
| DATED | : June 26, 2007 | |
| INVENTOR(S) | : Patrick Savage, Jitendra Chhikara and Frederick W. Platz, Jr. | |

It is certified that error appears in the above-identified patent and that said Letters Patent is hereby corrected as shown below:

In Column 34, Line 42, please change "associated with the account data received, and wherein the" to -- associated with the account data received. --

In Column 34, please remove/delete Lines 43-46.

In Column 36, Line 2, please change "bill account, wherein the customer continues to purchase" to -- bill account and wherein the customer continues to purchase --

In Column 36, Line 5, please change "ciated with the account data received, and wherein the" to -- ciated with the account data received. --

In Column 36, please remove/delete Lines 6-9.

Signed and Sealed this

Twenty-first Day of April, 2009

JOHN DOLL
*Acting Director of the United States Patent and Trademark Office*